United States Patent
Mashio et al.

(10) Patent No.: US 9,928,942 B2
(45) Date of Patent: Mar. 27, 2018

(54) PIPE TYPE SOLID INSULATION CABLE SYSTEM, METHOD OF CONSTRUCTING PIPE TYPE SOLID INSULATION CABLE SYSTEM AND METHOD OF COOLING PIPE TYPE SOLID INSULATION CABLE SYSTEM

(71) Applicant: SUMITOMO ELECTRIC INDUSTRIES, LTD., Osaka (JP)

(72) Inventors: Shoji Mashio, Osaka (JP); Satoshi Ona, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/294,908

(22) Filed: Oct. 17, 2016

(65) Prior Publication Data
US 2017/0229214 A1    Aug. 10, 2017

(30) Foreign Application Priority Data
Feb. 5, 2016    (JP) .................................. 2016-021006

(51) Int. Cl.
| H01B 7/42 | (2006.01) |
| G01K 13/00 | (2006.01) |
| H02G 3/04 | (2006.01) |
| H02G 9/06 | (2006.01) |
| G01K 1/14 | (2006.01) |
| G01K 11/32 | (2006.01) |

(52) U.S. Cl.
CPC .............. *H01B 7/423* (2013.01); *G01K 1/14* (2013.01); *G01K 11/32* (2013.01); *G01K 13/00* (2013.01); *H02G 9/06* (2013.01); *G01K 2011/324* (2013.01)

(58) Field of Classification Search
CPC ........... H01B 7/423; H01B 12/16; H02G 3/03
See application file for complete search history.

(56) References Cited

U.S. PATENT DOCUMENTS

| 3,924,054 A * | 12/1975 | Falke ....................... H01B 7/29 174/110 PM |
| 5,308,162 A * | 5/1994 | Amano ................. G01M 3/047 374/131 |
| 2009/0170706 A1* | 7/2009 | Hirose ................... H01B 12/16 505/163 |

(Continued)

FOREIGN PATENT DOCUMENTS
JP    H11-273465    10/1999

*Primary Examiner* — Hoa C Nguyen
*Assistant Examiner* — Amol Patel
(74) *Attorney, Agent, or Firm* — IPUSA, PLLC

(57) ABSTRACT

A pipe type solid insulation cable system includes a plurality of solid insulation cables; a plurality of steel pipes in which the plurality of solid insulation cables are inserted, respectively; and a refrigerant circulation path that includes a plurality of refrigerant pipes, which are provided to be adjacent to the plurality of steel pipes, respectively, circularly connected with each other to circulate a refrigerant therein, wherein the pipe type solid insulation cable system is configured to indirectly cool the plurality of solid insulation cables in the plurality of steel pipes, respectively, by cooling at least a part of a periphery of each of the plurality of steel pipes by the refrigerant circulation path without flowing the refrigerant in the plurality of steel pipes.

12 Claims, 14 Drawing Sheets

(56) References Cited

U.S. PATENT DOCUMENTS

| | | | |
|---|---|---|---|
| 2009/0231075 A1* | 9/2009 | Moia | H01F 27/12 336/61 |
| 2011/0308259 A1* | 12/2011 | Wray | F16L 55/103 62/3.3 |
| 2013/0118746 A1* | 5/2013 | Delp | E21B 36/006 166/302 |
| 2013/0269966 A1* | 10/2013 | Emme | H01B 7/423 174/15.6 |
| 2014/0221213 A1* | 8/2014 | Fukuda | H01B 12/16 505/163 |

* cited by examiner

PIPE TYPE SOLID INSULATION CABLE SYSTEM, METHOD OF CONSTRUCTING PIPE TYPE SOLID INSULATION CABLE SYSTEM AND METHOD OF COOLING PIPE TYPE SOLID INSULATION CABLE SYSTEM

CROSS-REFERENCE TO RELATED APPLICATION

The present application is based on and claims the benefit of priority of Japanese Priority Application No. 2016-021006 filed on Feb. 5, 2016, the entire contents of which are hereby incorporated by reference.

BACKGROUND OF THE INVENTION

1. Field of the Invention

The present invention relates to a pipe type solid insulation cable system, a method of constructing the pipe type solid insulation cable system and a method of cooling the pipe type solid insulation cable system.

2. Description of the Related Art

Conventionally, a pipe type oil filled cable (or a high pressure fluid filled (HPFF) pipe type cable, hereinafter, simply referred to as an "OF cable") system is known as an underground bulk power transmission line. The OF cable system is configured to include an OF cable, which is inserted in a steel pipe for OF cable, and high pressure insulating oil is filled in the steel pipe for OF cable to be circulated. With this configuration, insulating properties of the OF cable can be improved and the OF cable can be cooled as well.

However, as high pressure is applied to the insulating oil in the steel pipe for OF cable in the OF cable system, there is a possibility that the insulating oil leaks from joint portions of the steel pipes for OF cable. Thus, there is a risk that peripheral environment is affected by the leakage of the insulating oil.

Thus, recently, the OF cable of the OF cable system has been substituted by a solid insulation cable (a cross-linked polyethylene insulated polyvinylchloride sheathed cable or an XLPE cable, simply referred to as an "XLPE cable") (Patent Document 1, for example).

PATENT DOCUMENT

Patent Document 1

Japanese Patent No. 3,957,865

According to the structure disclosed in Patent Document 1 or the like, a refrigerant such as water or the like is circulated in a steel pipe for XLPE cable using a path similar to an oil circulation pipe of the conventional OF cable system. In other words, according to the structure disclosed in Patent Document 1 or the like, a "direct cooling method" is used by which the XLPE cable in the steel pipe for XLPE cable is directly cooled by the refrigerant.

However, according to the direct cooling method disclosed in Patent Document 1 or the like, as the XLPE cable is inserted in the steel pipe for XLPE cable while the refrigerant is circulated in the steel pipe for XLPE cable, it is difficult to seal the steel pipe for XLPE cable for suppressing leakage of the refrigerant, and the system structure is complicated.

SUMMARY OF THE INVENTION

The present invention is made in light of the above problems, and provides a pipe type solid insulation cable system, a method of constructing the pipe type solid insulation cable system and a method of cooling the pipe type solid insulation cable system capable of easily cooling the solid insulation cable by a simple structure.

According to an embodiment, there is provided a pipe type solid insulation cable system including a plurality of solid insulation cables; a plurality of steel pipes in which the plurality of solid insulation cables are inserted, respectively; and a refrigerant circulation path that includes a plurality of refrigerant pipes, which are provided to be adjacent to the plurality of steel pipes, respectively, circularly connected with each other to circulate a refrigerant therein, wherein the pipe type solid insulation cable system is configured to indirectly cool the plurality of solid insulation cables in the plurality of steel pipes, respectively, by cooling at least a part of a periphery of each of the plurality of steel pipes by the refrigerant circulation path without flowing the refrigerant in the plurality of steel pipes.

According to another embodiment, there is provided a method of constructing a pipe type solid insulation cable system by diverting a previously provided oil filled cable system, the previously provided oil filled cable system including a plurality of steel pipes for oil filled cable, in each of which insulating oil is filled and in which a plurality of oil filled cables are inserted, respectively, and a plurality of oil circulation pipes, which are provided to be adjacent to the plurality of steel pipes for oil filled cable, respectively, and independently circulating the insulating oil in the plurality of steel pipes for oil filled cable, respectively, the method including: removing the insulating oil and the plurality of oil filled cables from the plurality of steel pipes for oil filled cable, respectively, and removing the insulating oil from the plurality of oil circulation pipes; inserting a plurality of solid insulation cables in a plurality of steel pipes, respectively, which are diverted from the plurality of steel pipes for oil filled cable, respectively; and circularly connecting a plurality of refrigerant pipes, diverted from the plurality of oil circulation pipes, respectively, to constitute a refrigerant circulation path in which refrigerant is circulated, wherein the refrigerant circulation path is configured to indirectly cool the plurality of solid insulation cables in the plurality of steel pipes, respectively, by cooling at least a part of periphery of each of the plurality of steel pipes without flowing the refrigerant in the plurality of steel pipes.

According to another embodiment, there is provided a method of cooling a pipe type solid insulation cable system, including a plurality of solid insulation cables, and a plurality of steel pipes in which the plurality of solid insulation cables are inserted, respectively, the method including: constructing a refrigerant circulation path by providing a plurality of refrigerant pipes to be adjacent to the plurality of steel pipes, respectively, and circularly connecting the plurality of refrigerant pipes; and circulating a refrigerant in the refrigerant circulation path, wherein in the circulating, the plurality of solid insulation cables in the plurality of steel pipes, respectively, are indirectly cooled by cooling at least a part of periphery of each of the plurality of steel pipes by the refrigerant circulation path without flowing the refrigerant in each of the plurality of steel pipes.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
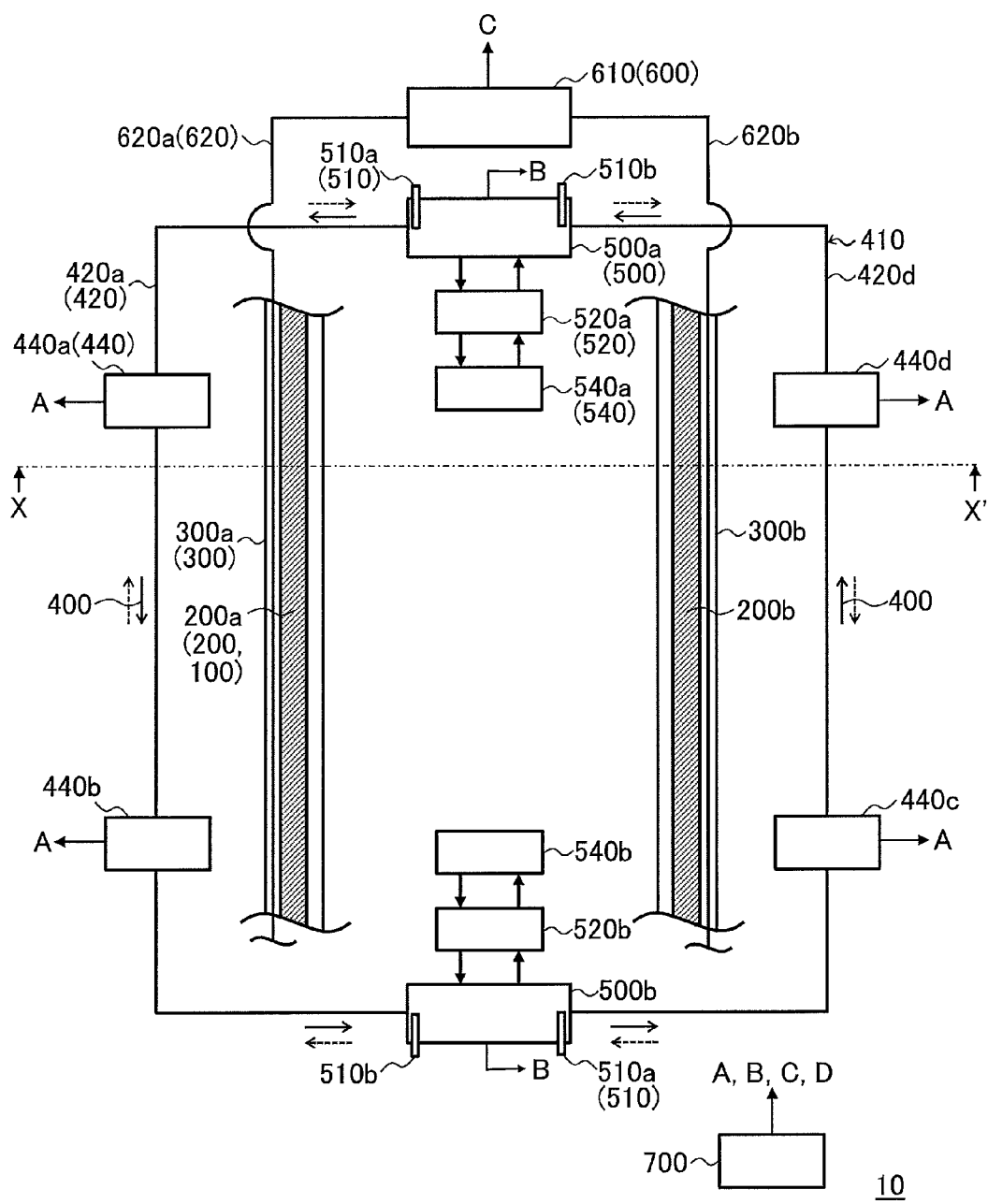
FIG. 1 is a plan view schematically illustrating a pipe type solid insulation cable system of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Observation by present inventors)
(Conventional Pipe Type Oil Filled Cable System)

Figure 10:
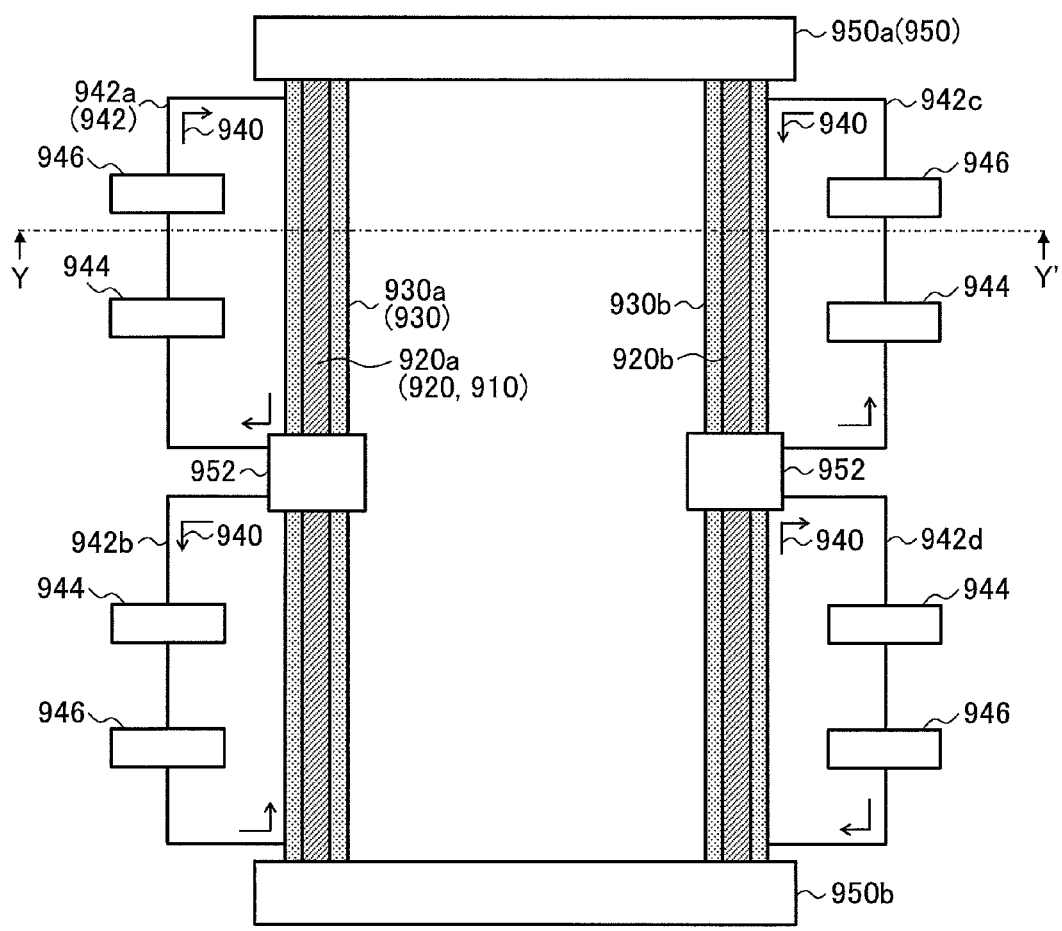
FIG. 10 is a plan view schematically illustrating a pipe type oil filled cable system of a comparative example 1.
Figure 11:
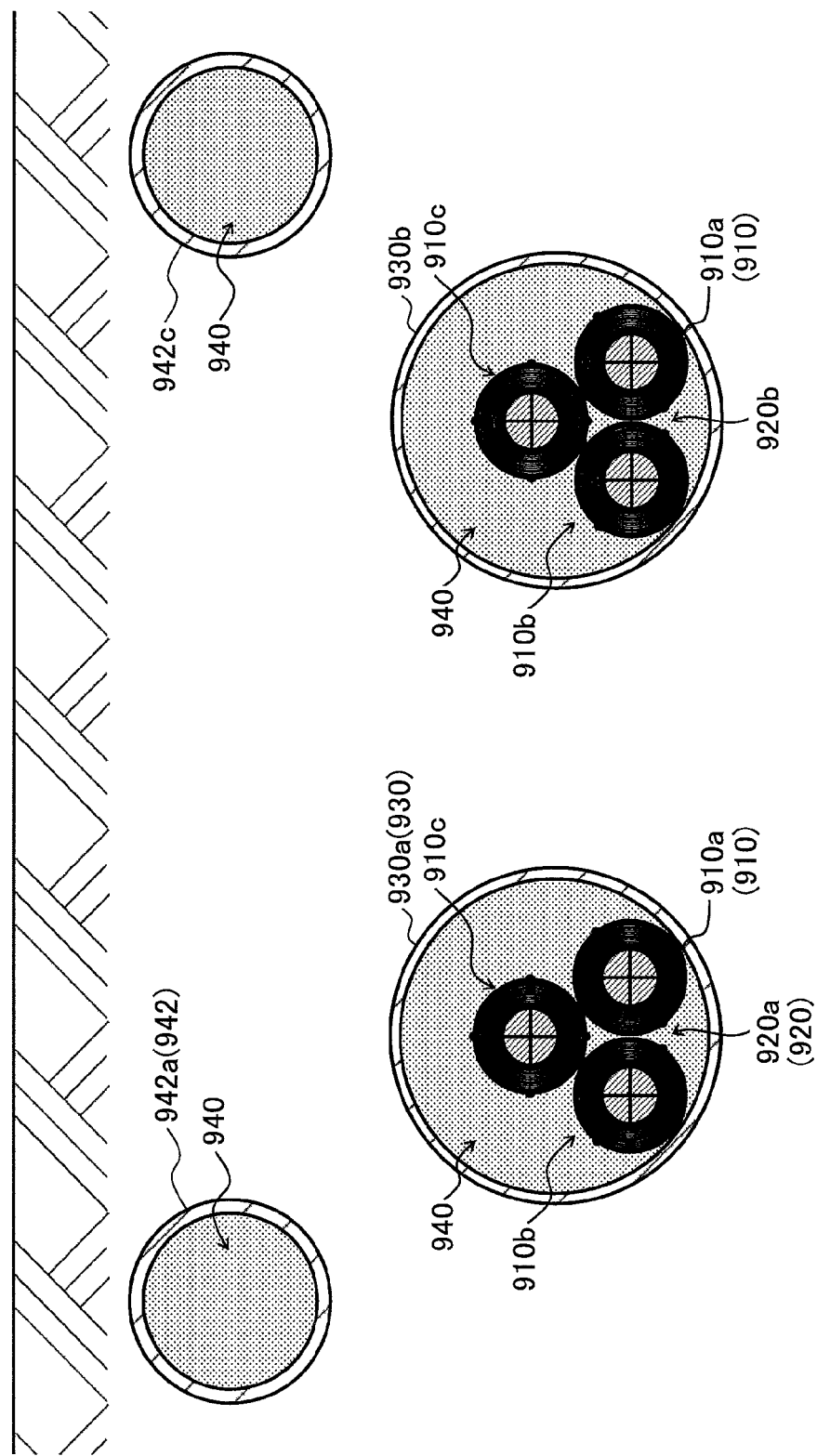
FIG. 11 is a cross-sectional view illustrating the pipe type oil filled cable system of the comparative example 1.
Figure 12:
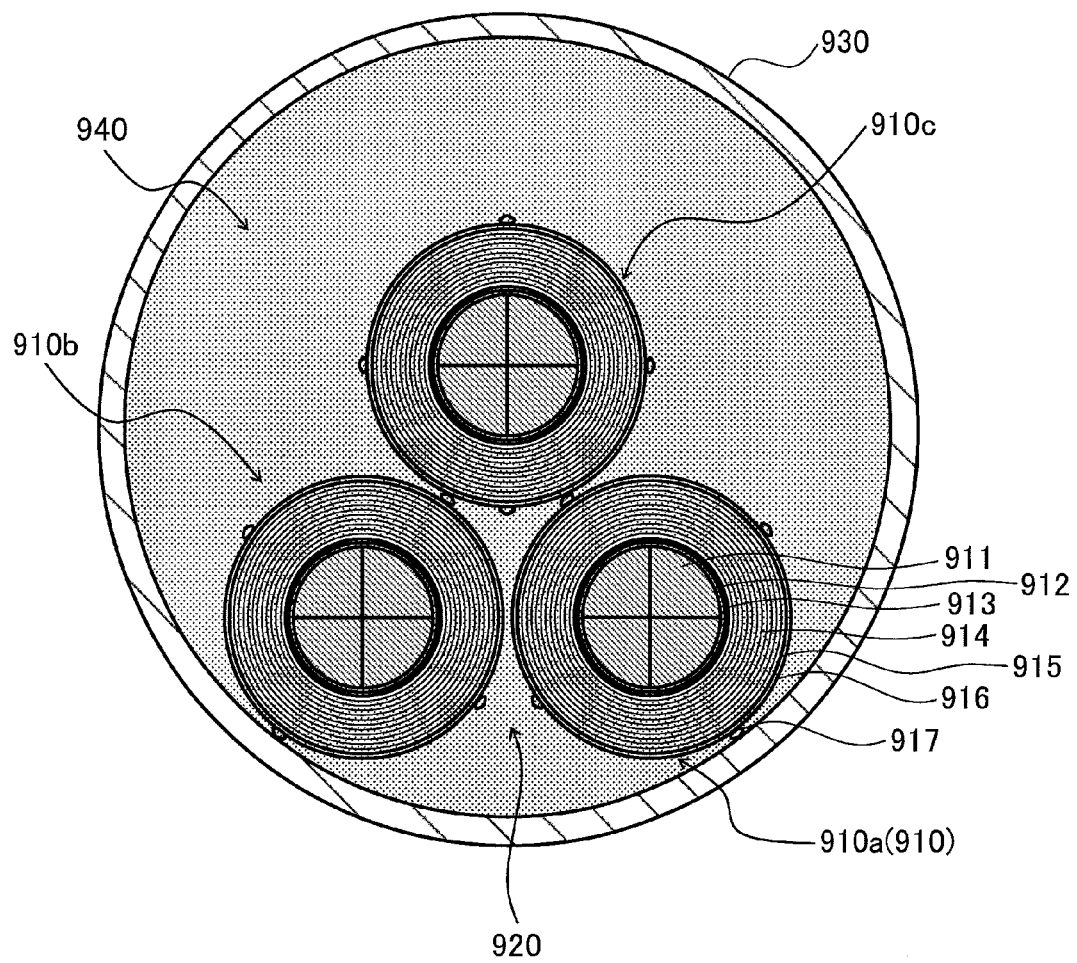
FIG. 12 is a view in which a part of FIG. 11 is enlarged.

First, with reference to FIG. 10 to FIG. 12, a pipe type oil filled cable system (hereinafter, simply referred to as an "OF cable system") of a comparative example 1 is described as a conventional example. FIG. 10 is a plan view schematically illustrating an OF cable system 90 of the comparative example 1. FIG. 11 is a cross-sectional view illustrating the OF cable system 90 of the comparative example 1. FIG. 11 a cross-sectional view taken along a Y-Y' line of FIG. 10. FIG. 12 is a view in which a part of FIG. 11 is enlarged.

Hereinafter, when each of a plurality of the same components is differentiated from each other, the component is referred to with a number and a letter, and when generally referring to the plurality of components, the components are referred to with a number only. For example, when each of a plurality of steel pipes for an OF cable is differentiated from each other, the steel pipe for the OF cable is referred to as "930a" or the like, and the steel pipes for the OF cables are referred to as "930" when generally referring to steel piped for OF cables As illustrated in FIG. 10 and FIG. 11, the OF cable system 90 of the comparative example 1 is configured such that high pressure insulating oil 940 is filled and circulated in a steel pipe for OF cable 930 in which an OF cable (or an OF cable core) 910 is inserted. Specifically, the OF cable system 90 includes OF cable groups (a group of the OF cables or a three-phase OF cable) 920, steel pipes for OF cable 930, pump stations 950, back-flow diffusive valves (diffusive chambers) 952, oil circulation pipes 942, pumps (booster pumps) 944 and heat exchangers 946, for example.

The OF cable system 90 of the comparative example 1 is configured to draw two lines of the OF cable groups 920. Specifically, a pair of the steel pipes for OF cable 930 (930a, 930b) are buried in the ground. The steel pipes for OF cable 930a and 930b are placed to be apart from each other with a predetermined distance. The steel pipes for OF cable 930a and 930b are extended in the same direction. The OF cable groups 920a and 920b are inserted in the steel pipes for OF cable 930a and 930b, respectively.

As illustrated in FIG. 12, the OF cable group 920 is configured to transmit three-phase current, and includes three OF cables 910 (910a to 910c), for example. Each of the OF cables 910 includes a conductor 911, a stainless steel tape 912, a carbon paper 913, an oil filled insulating paper 914, a reinforcement layer 915, a damp proof layer 916, and a skid wire 917, from center toward outer, for example. Insulating oil 940 is filled in the steel pipe for OF cable 930 under a status that the OF cable group 920 is inserted in the steel pipe for OF cable 930. With this configuration, the insulating oil 940 penetrates into the oil filled insulating paper 910 of each of the OF cables 910, and insulating properties of the OF cables 910 are maintained.

The pump station 950 includes a pump for oil station (not illustrated in the drawings) and an oil tank (not illustrated in the drawings). The pump station 950 is configured to maintain the pressure of the insulating oil 940 in the steel pipe for OF cable 930 at a predetermined value by providing the insulating oil 940 from the oil tank to the steel pipe for OF cable 930 while pressurizing the insulating oil 940 by the pump for oil station. The OF cable system 90 includes a pair of the pump stations 950, for example. Specifically, the pump station 950a is connected to one ends of the steel pipes for OF cable 930a and 930b, and the pump station 950b is connected to the other ends of the steel pipes for OF cable 930a and 930b. With this configuration, the insulating oil 940 is pressurized from both ends of each of the steel pipes for OF cable 930a and 930b.

The back-flow diffusive valves 952 are respectively connected to the steel pipes for OF cable 930a and 930b at an intermediate position between the two pump stations 950, for example. The back-flow diffusive valve 952 is configured to suppress back-flow of the insulating oil 940 by maintaining the flow of the insulating oil 940 from each of the pump stations 950 even when the pressures of the insulating oil 940 from the two pump stations 950 are different.

The oil circulation pipe 942 is configured as a path to circulate the insulating oil 940 in the respective steel pipe for OF cable 930, and is configured by a steel pipe (iron pipe), for example. The oil circulation pipe 942 is provided for each of the steel pipes for OF cable 930. Specifically, the oil circulation pipe 942a is provided to be adjacent to the steel pipe for OF cable 930a with a predetermined distance from the steel pipe for OF cable 930a at an opposite side of the steel pipe for OF cable 930b with respect to the steel pipe for OF cable 930a. Meanwhile, the oil circulation pipe 942c is provided to be adjacent to the steel pipe for OF cable 930b with a predetermined distance from the steel pipe for OF cable 930b at an opposite side of the steel pipe for OF cable 930a with respect to the steel pipe for OF cable 930b. The oil circulation pipes 942a and 942c extend along the steel pipes for OF cable 930a and 930b in an axial direction of the steel pipes for OF cable 930a and 930b.

The oil circulation pipe 942 is configured to separately circulate the insulating oil 940 for every predetermined distance in an axial direction of the steel pipe for OF cable 930. Specifically, the oil circulation pipe 942a is circularly connected to the steel pipe for OF cable 930a between the pump station 950a and the back-flow diffusive valve 952. One end of the oil circulation pipe 942a is connected to the back-flow diffusive valve 952. The pump 944 and the heat exchanger 946 are provided at the oil circulation pipe 942a in this order from a back-flow diffusive valve 952 side. The pump 944 is configured to circulate the insulating oil 940 in a predetermined direction. The heat exchanger 946 is configured to cool the insulating oil 940 by discharging the heat of the insulating oil 940. With this configuration, the insulating oil 940 is configured to circulate in a direction from the pump station 950a to the back-flow diffusive valve 952 in the steel pipe for OF cable 930a between the pump station 950a and the back-flow diffusive valve 952 via the oil circulation pipe 942a.

Meanwhile, the oil circulation pipe 942b is provided on a line that extends from the oil circulation pipe 942a, for example. The pump 944 and the heat exchanger 946 connected to the oil circulation pipe 942b are symmetrically provided with the pump 944 and the heat exchanger 946 connected to the oil circulation pipe 942a while interposing the back-flow diffusive valve 952 therebetween. With this configuration, the insulating oil 940 is configured to circulate in a direction from the pump station 950b to the back-flow diffusive valve 952 in the steel pipe for OF cable 930a between the pump station 950b and the back-flow diffusive valve 952 via the oil circulation pipe 942b.

Further, the oil circulation pipe 942 is configured to independently circulate the insulating oil 940 in each of the pair of steel pipes for OF cable 930. Specifically, in addition to the oil circulation pipes 942a and 942b connected to the steel pipe for OF cable 930a, each of the oil circulation pipes 942c and 942d are circularly connected to the steel pipe for OF cable 930b to be symmetrically with the oil circulation pipes 942a and 942b connected to the steel pipe for OF cable 930a. With this configuration, the insulating oil 940 is configured to circulate in a direction from the pump station 950a to the back-flow diffusive valve 952 in the steel pipe for OF cable 930b between the pump station 950a and the back-flow diffusive valve 952 via the oil circulation pipe 942c. Further, the insulating oil 940 is configured to circulate in a direction from the pump station 950b to the back-flow diffusive valve 952 in the steel pipe for OF cable 930b between the pump station 950b and the back-flow diffusive valve 952 via the oil circulation pipe 942d.

As described above, the OF cable group 920 inserted in the steel pipe for OF cable 930 is cooled by circulating the insulating oil 940 in the steel pipe for OF cable 930 via the oil circulation pipe 942.

(Substitution to Solid Insulation Cable System)

As described above, high pressure is applied to the insulating oil 940 in the steel pipe for OF cable 930 in order to maintain the insulating properties of the OF cable 910 in the OF cable system 90 of the comparative example 1, as a conventional example. Thus, there is a possibility that the insulating oil 940 leaks from joint portions or the like of the steel pipes for OF cable 930. Thus, there is a risk that environment around the OF cable system 90 is affected by the leakage of the insulating oil 940.

Thus, recently, as described in Patent Document 1, the OF cable 910 of the OF cable system 90 has been substituted by the solid insulation cable (XLPE cable).

According to the structure disclosed in Patent Document 1 or the like, a refrigerant such as water or the like is circulated in the steel pipe for XLPE cable using a path similar to the oil circulation pipe 942 of the OF cable system 90 of the comparative example 1. In other words, according to the structure disclosed in Patent Document 1 or the like, a "direct cooling method" is used by which the XLPE cable in a steel pipe for XLPE cable is directly cooled by the refrigerant.

However, according to the direct cooling method disclosed in Patent Document 1 or the like, as the XLPE cable is inserted in the steel pipe for XLPE cable while the refrigerant is circulated in the steel pipe for XLPE cable, it is difficult to seal the steel pipe for XLPE cable for suppressing leakage of the refrigerant, and the system structure is complicated.

Specifically, it is difficult to connect a pair of XLPE cables in an axial direction under a status that the steel pipe for XLPE cable is sealed for suppressing leakage of the refrigerant. Further, as the XLPE cable is larger (thicker) than the conventional OF cable, it is difficult to house joint portions of the XLPE cables in the steel pipe for XLPE cable under a status that the steel pipe for XLPE cable is sealed. Further, as the XLPE cable expands and contracts in an axial direction due to the Joule heat generated when energizing, it is difficult to maintain the sealing properties of the steel pipe for XLPE cable when the XLPE cable expands and contracts. Because of these, according to the direct cooling method, the system structure is complicated and it is difficult to substitute the OF cable by the XLPE cable.

The present invention is made based on the above observation by the present inventors.

(First Embodiment)

(1) Pipe Type XLPE Cable System

Figure 2:
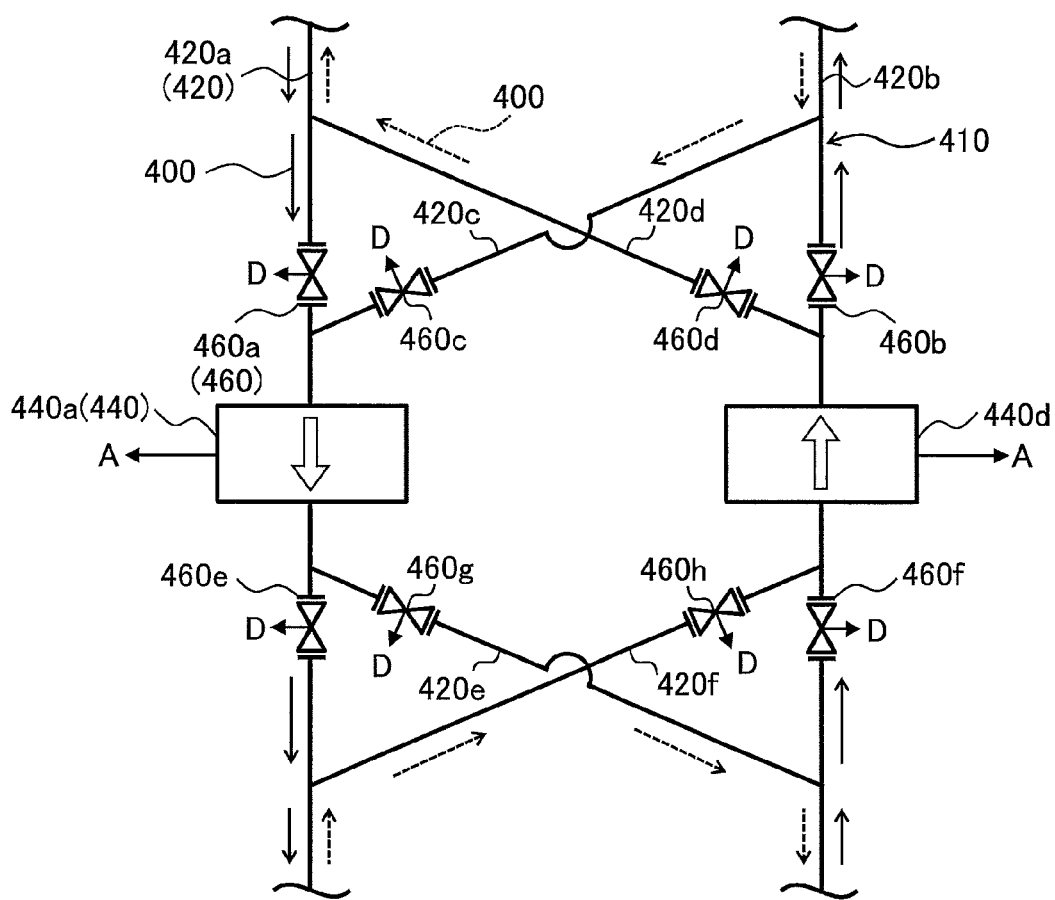
FIG. 2 is a plan view schematically illustrating a structure for changing a direction of flow of a refrigerant in a refrigerant circulation path.
Figure 3:
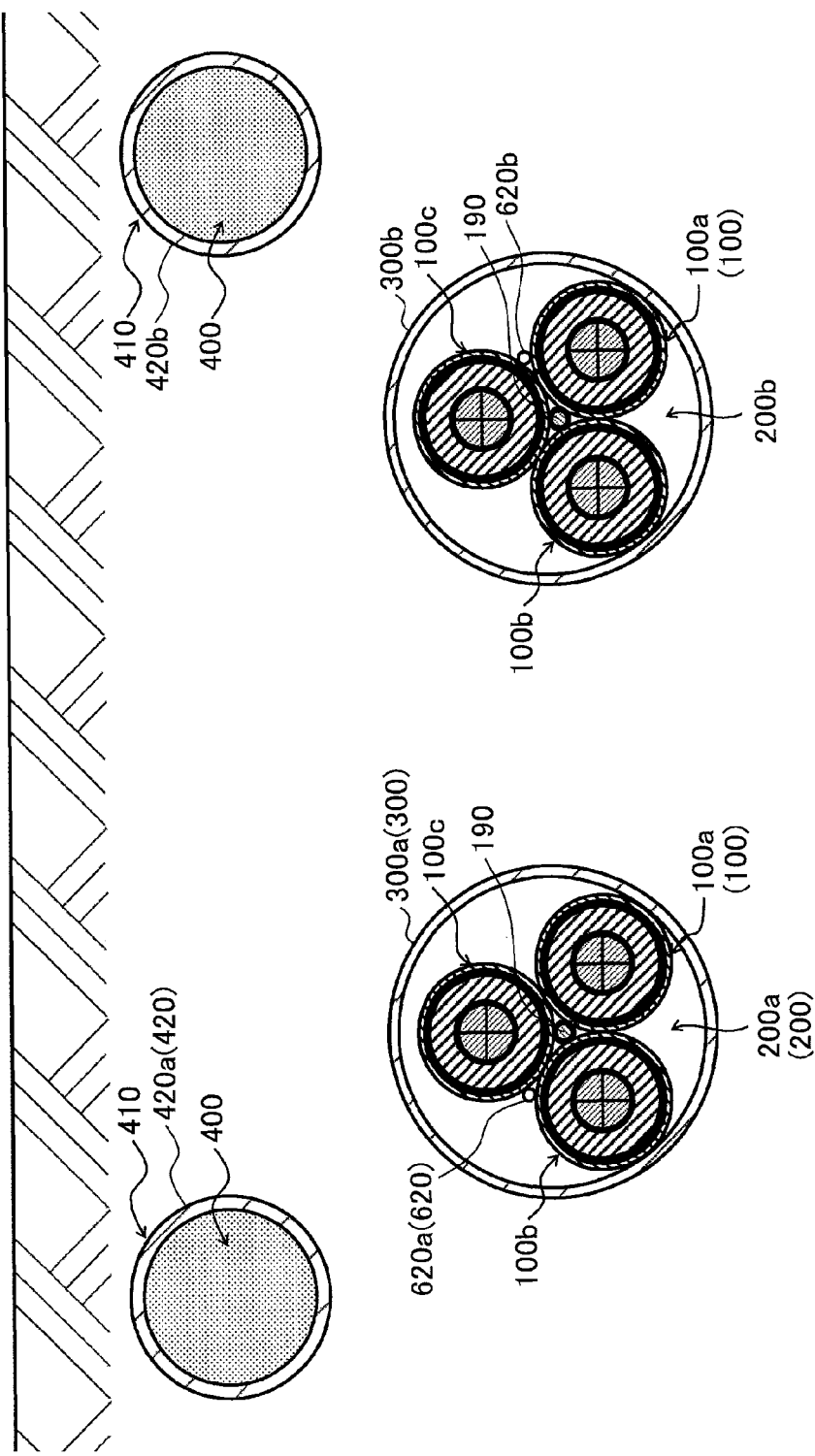
FIG. 3 is a cross-sectional view illustrating the pipe type solid insulation cable system of the first embodiment.
Figure 4:
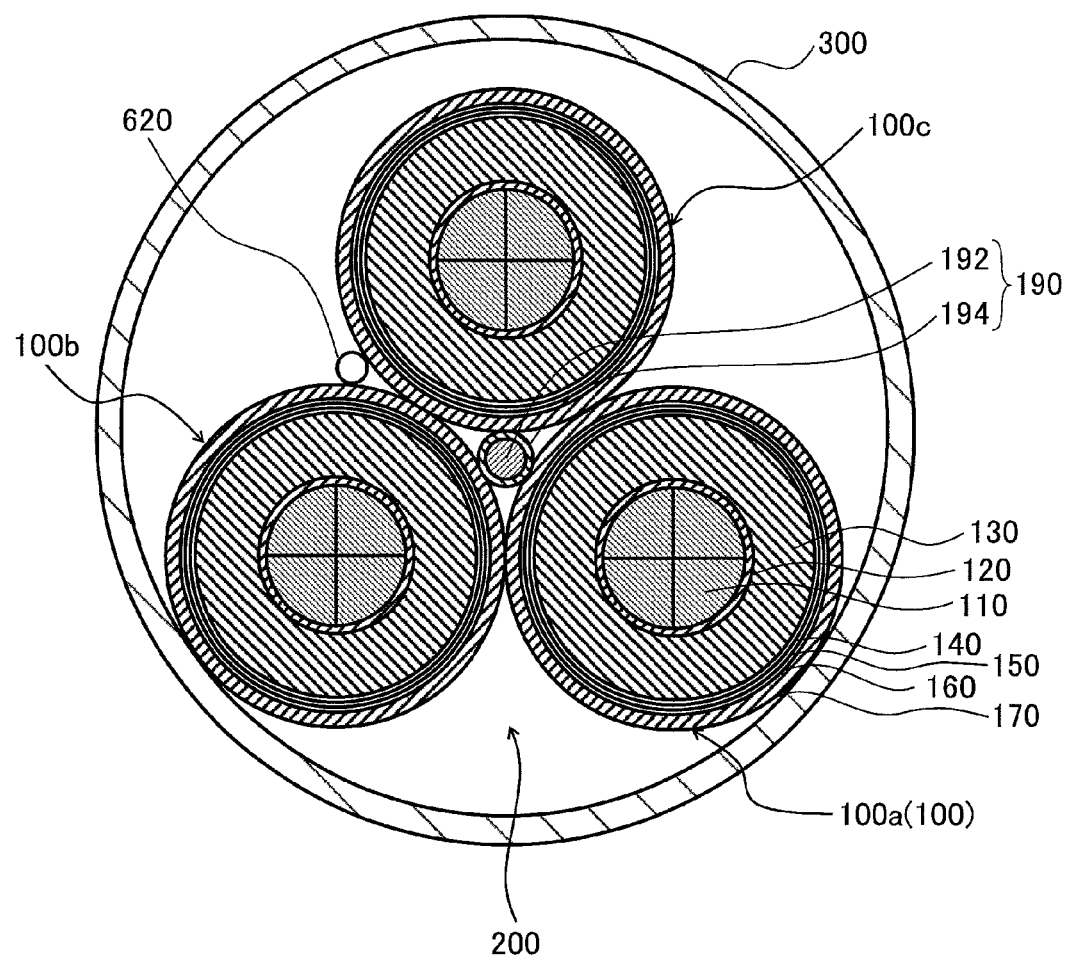
FIG. 4 is a view in which a part of FIG. 3 is enlarged.

A pipe type solid insulation cable system (hereinafter, simply referred to as a "XLPE cable system") of the first embodiment is described with reference to FIG. 1 to FIG. 4. FIG. 1 is a plan view schematically illustrating an XLPE cable system 10 of the embodiment. FIG. 2 is a plan view schematically illustrating a structure for changing a flow direction of a refrigerant in a refrigerant circulation path. Here, steel pipes for XLPE cable 300 and XLPE cable groups 200, which will be described later, are not illustrated in FIG. 2. FIG. 3 is a cross-sectional view illustrating the XLPE cable system 10 of the embodiment. FIG. 3 is a cross-sectional view taken along an X-X' line of FIG. 1. FIG. 4 is an enlarged view of a part of FIG. 3.

As illustrated in FIG. 1, the XLPE cable system 10 of the embodiment is configured to cool a solid insulation cable (hereinafter, simply referred to as a "XLPE cable") by an indirect cooling method by substituting the previously provided OF cable system 90 in the above described comparative example 1. The XLPE cable system 10 includes XLPE cable groups (a group of the XLPE cables or a three-phase XLPE cable) 200, steel pipes for XLPE cable 300, a refrigerant circulation path 410, refrigerant storage tanks 500, pumps 440 and a control unit 700.

(Steel Pipe for XLPE Cable)

As illustrated in FIG. 1 and FIG. 3, the pipe type XLPE cable system 10 is configured to draw two lines of the XLPE cable groups 200. Specifically, a pair of the steel pipes for XLPE cable 300 (300a, 300b) are buried in the ground. The steel pipes for XLPE cable 300a and 300b are placed to be apart from each other with a predetermined distance in a horizontal direction. The steel pipes for XLPE cable 300a and 300b are extended in the same direction. The XLPE cable groups 200a and 200b are inserted in the steel pipes for XLPE cable 300a and 300b, respectively.

In this embodiment, the steel pipes for OF cable 930a and 930b of the previously provided OF cable system 90, in which the insulating oil 940 is filled and in which the OF cable groups 920a and 920b are inserted, respectively, may be diverted to the steel pipes for XLPE cable 300a and 300b, respectively, by removing the insulating oil 940 and the OF cable groups 920a and 920b from the steel pipes for OF cable 930a and 930b, for example. As the steel pipe for OF cable 930 is used as the steel pipe for XLPE cable 300, the material of the steel pipe for XLPE cable 300 may be the same as that of the steel pipe for OF cable 930.

(XLPE Cable Group (XLPE Cable))

As illustrated in FIG. 4, the XLPE cable group 200 is configured to transmit three-phase current, and includes three XLPE cables 100 (100a to 100c), and a single return cable 190, for example.

Each of the XLPE cables 100 includes a conductor 110, a conductor screen (an inner semi-conducting layer) 120, an insulating layer 130, an insulating screen (an outer semi-conducting layer) 140, a bedding 150, a metal sheath 160 and a jacket (a corrosion-proof layer) 170 from center toward outer, for example. The conductor 110 is configured by cabling a plurality of copper wires, for example. The conductor screen 120 is made of a semi conductive tape or a resin layer containing carbon powders, with heat resistance, for example. For the semi conductive tape, nylon or polyester is used, for example. For the resin layer containing carbon powders, EEA (Ethylene-Ethylacrylate Copolymer) or polyethylene is used, for example. The insulating layer 130 is made of cross-linked polyethylene, for example. The insulating screen 140 is made of a resin layer containing carbon powders, for example. For the resin layer containing carbon powders, EEA or polyethylene is used, for example. The bedding 150 is made of a so-called bedding tape. The metal sheath 160 is configured to shield electrostatic and electromagnetic induction of the conductor 110, and to be a path for a fault current. Specifically, the metal sheath 160 is a copper laminate, for example. The jacket 170 is made of cross-linked polyethylene, high-density polyethylene or PVC (Polyvinylchloride), for example.

The return cable 190 is grounded with the steel pipe for XLPE cable 300 and is configured to be a path for a fault current. Specifically, the return cable 190 includes a return conductor 192 and a return jacket 194 from center toward outer, for example. The return conductor 192 is configured by a copper wire, for example. The return jacket 194 is made of cross-linked polyethylene, high-density polyethylene or PVC, for example.

In this embodiment, the three XLPE cables 100 are helically twisted while having the return cable 190 positioned at center. With this, even when each of the XLPE cables 100 expands in the axial direction due to the Joule heat generated when energizing, twisting of the XLPE cables 100 is loosened and the XLPE cables 100 expand in a radial direction of the steel pipe for XLPE cable 300. Thus, the XLPE cables 100 are suppressed from extending out from the steel pipe for XLPE cable 300 in the axial direction.

The XLPE cable groups 200a and 200b are provided with optical fibers 620a and 620b, respectively, that constitute the cable temperature measurement device 600. The cable temperature measurement device 600 is described later in detail.

(Refrigerant Circulation Path)

As illustrated in FIG. 1 and FIG. 3, the refrigerant circulation path 410 is configured to indirectly cool the XLPE cables 100 in the steel pipe for XLPE cable 300 via soil (ground) by circulating the refrigerant 400. The refrigerant 400 is water or antifreeze liquid, for example.

The refrigerant circulation path 410 is configured by circularly connecting a plurality of refrigerant pipes 420. The refrigerant pipes 420 are provided to correspond to the steel pipes for XLPE cable 300, respectively. Specifically, the refrigerant pipe 420a is provided to be adjacent to the steel pipe for XLPE cable 300a with a predetermined distance from the steel pipe for XLPE cable 300a at an opposite side of the steel pipe for XLPE cable 300b while interposing the steel pipe for XLPE cable 300a therebetween. Meanwhile, the refrigerant pipe 420b is provided to be adjacent to the steel pipe for XLPE cable 300b with a predetermined distance from the steel pipe for XLPE cable 300b at an opposite side of the steel pipe for XLPE cable 300a while interposing the steel pipe for XLPE cable 300b therebetween. Each of the refrigerant pipes 420a and 420b extends in an axial direction of the respective steel pipe for XLPE cable 300a or 300b to extend along the respective steel pipe for XLPE cable 300a or 300b. One end of the refrigerant pipe 420a and one end of the refrigerant pipe 420b are connected by other refrigerant pipes 420, and the other end of the refrigerant pipe 420a and the other end of the refrigerant pipe 420b are connected by other refrigerant pipes 420. With this configuration, the circular refrigerant circulation path 410 is formed.

In this embodiment, the components of the previously provided OF cable system 90 may be diverted. Specifically, for example, the oil circulation pipes 942a to 942d of the OF cable system 90, that are provided to be adjacent to the steel pipes for OF cable 930a and 930b, respectively, for individually circulating the insulating oil 940 in the steel pipes for OF cable 930a and 930b, are diverted to the refrigerant pipes 420a and 420b, after removing the insulating oil 940. As the oil circulation pipes 942 are diverted to the refrigerant pipes 420, the material of the refrigerant pipes 420 are the same as that of the oil circulation pipes 942.

Further, in this embodiment, the refrigerant circulation path 410 is configured by the circularly connected refrigerant pipes 420a and 420b, diverted from the oil circulation pipes 942a to 942d, without passing through the steel pipes for XLPE cable 300a and 300b. As the even number of the OF cable groups 920, the steel pipes for OF cable 930 and the oil circulation pipes 942 are provided in the previously provided OF cable system 90 in many cases, it is easy to form the circular refrigerant circulation path 410 by diverting and connecting the even number of the oil circulation pipes 942.

For a specific size of each of the components, when the normal voltage of the XLPE cable 100 is greater than or equal to 110 kV and less than or equal to 345 kV, and the diameter of the XLPE cable 100 is greater than or equal to 60 mm and less than or equal to 131 mm, the diameter of the steel pipe for XLPE cable 300 is greater than or equal to 150 mm and less than or equal to 310 mm. The diameter of the refrigerant pipe 420 is greater than or equal to 100 mm and less than or equal to 200 mm, for example. At this time, the distance between the refrigerant pipe 420 and the adjacent steel pipe for XLPE cable 300 (the distance between an outer periphery surface of the refrigerant pipe 420 and an outer periphery surface of the steel pipe for XLPE cable 300) is greater than or equal to 0 mm and less than or equal 500 mm, for example. "The distance between the refrigerant pipe 420 and the steel pipe for XLPE cable 300 is 0 mm" means that the refrigerant pipe 420 and the steel pipe for XLPE cable 300 contact with each other. When the distance between the refrigerant pipe 420 and the steel pipe for XLPE cable 300 exceeds 500 mm, an effect of indirectly cooling the XLPE cable group 200 in the steel pipe for XLPE cable 300 by the refrigerant pipe 420 becomes weak. On the other hand, when the distance between the refrigerant pipe 420 and the steel pipe for XLPE cable 300 is less than or equal to 500 mm, the effect of indirectly cooling the XLPE cable group 200 in the steel pipe for XLPE cable 300 by the refrigerant pipe 420 can be sufficiently obtained.

(Refrigerant Storage Tank)

The refrigerant storage tank 500 is connected to each of the refrigerant pipes 420a and 420b, and is configured to temporarily store the refrigerant 400 while keeping the refrigerant 400 cool. A chiller 520 and a heat exchanger 540 are connected to the refrigerant storage tank 500 in this order. The chiller 520 is configured to cool the refrigerant 400 by circulating the refrigerant 400 with the refrigerant storage tank 500. The temperature of the refrigerant 400 in the refrigerant storage tank 500 is 10° C., for example. The heat exchanger 540 is configured to circulate refrigerant gas (not illustrated in the drawings) with the chiller 520 to compress and vaporize it so that the refrigerant gas absorbs heat and the refrigerant 400 is cooled in the heat exchanger 540. With this configuration, the refrigerant 400 is cooled continuously or at predetermined timing, and the temperature of the refrigerant 400 in the refrigerant storage tank 500 is maintained at predetermined temperature.

The refrigerant storage tank 500 includes a tank pump (not illustrated in the drawings) that transmits the refrigerant 400 in a predetermined direction. The refrigerant storage tank 500 includes a switching valve (not illustrated in the drawings) that changes the direction of flow of the refrigerant 400. Specifically, the switching valve is configured to connect one of the refrigerant pipes 420, that is previously connected to an outflow port of the refrigerant storage tank 500, to an inflow port of the refrigerant storage tank 500, and connect the other of the refrigerant pipes 420, that is previously connected to the inflow port of the refrigerant storage tank 500, to the outflow port of the refrigerant storage tank 500.

The refrigerant storage tank 500 includes a refrigerant temperature measurement unit 510 that measures temperature of the refrigerant 400 in the refrigerant storage tank 500. In this embodiment, pair of the refrigerant temperature measurement units 510 are provided, for example. An outflow port refrigerant temperature measurement unit 510a is provided at an outflow port of the refrigerant 400 in the refrigerant storage tank 500, and an inflow port refrigerant temperature measurement unit 510b is provided at an inflow port of the refrigerant 400 in the refrigerant storage tank 500. The amount of heat of the XLPE cables 100 absorbed by circulating the refrigerant 400 in the refrigerant circulation path 410 can be grasped by comparing the temperatures of the refrigerant 400 at the outflow port refrigerant temperature measurement unit 510a and the temperature of the refrigerant 400 at the inflow port refrigerant temperature measurement unit 510b, for example.

The refrigerant storage tank 500, the chiller 520 and the heat exchanger 540 configured as such are provided at both ends of the refrigerant pipes 420a and 420b. Specifically, the refrigerant storage tank 500a, the chiller 520a and the heat exchanger 540a are provided at the one ends of the refrigerant pipes 420a and 420b, while the refrigerant storage tank 500b, the chiller 520b and the heat exchanger 540b are provided at the other ends of the refrigerant pipes 420a and 420b. By providing the plurality of refrigerant storage tanks 500 and the like, cooling efficiency of the refrigerant 400 can be improved.

(Pump)

The pump 440 is provided at the refrigerant circulation path 410, and is configured to circulate (deliver) the refrigerant 400 in the refrigerant circulation path 410 in a predetermined direction. The direction of flow of the refrigerant 400 in the refrigerant pipe 420b is different (opposite) from the direction of flow of the refrigerant 400 in the refrigerant pipe 420a.

A plurality of the pumps 440 are provided along a longitudinal direction of the refrigerant circulation path 410 with a predetermined distance with each other, for example. Specifically, the pumps 440a and 440b are provided at the refrigerant pipe 420a with a predetermined distance therebetween, while the pumps 440c and 440d are provided at the refrigerant pipe 420b with a predetermined distance therebetween. With this configuration, even when the refrigerant pipes 420 do not have high compressive strength, the refrigerant 400 can be circulated for a long distance.

Here, as will be explained in the following with respect to FIG. 2, in this embodiment, the refrigerant circulation path 410 is configured to be capable of connecting, among the plurality of refrigerant pipes 420, upstream of the pump 440 to downstream of the pump 440, and downstream of the pump 440 to upstream of the pump 440. Here, "upstream" and "downstream" mean a direction of the refrigerant 400 transmitted by the respective pump 440. By configuring the refrigerant circulation path 410 as such, the direction of flow of the refrigerant 400 can be changed at, at least a part of the refrigerant circulation path 410, while maintain the direction of the refrigerant 400 transmitted by each of the pumps 440.

Specifically, as illustrated in FIG. 2, a refrigerant pipe (bypass refrigerant pipe) 420c connects the refrigerant pipe 420a at upstream of the pump 440a and the refrigerant pipe 420b at downstream of the pump 440d. A refrigerant pipe 420d connects the refrigerant pipe 420a at an opposite side of the pump 440a with respect to a joint portion of the refrigerant pipe 420a and the refrigerant pipe 420c, and the refrigerant pipe 420b between a joint portion of the refrigerant pipe 420b and the refrigerant pipe 420c and the pump 440d.

Meanwhile, at opposite sides of the refrigerant pipes 420c and 420d with respect to the pumps 440a and 440d, a refrigerant pipe 420e connects the refrigerant pipe 420a at downstream of the pump 440a and the refrigerant pipe 420b at upstream of the pump 440d. A refrigerant pipe 420f connects the refrigerant pipe 420a at an opposite side of the pump 440a with respect to a joint portion of the refrigerant pipe 420a and refrigerant pipe 420e, and the refrigerant pipe 420b between a joint portion of the refrigerant pipe 420b and the refrigerant pipe 420e and the pump 440d. These refrigerant pipes 420c to 420f are connected to each of the refrigerant pipes 420a and 420b by passing through the steel pipes for XLPE cable 300a and 300b (by stepping over the steel pipes for XLPE cable 300a and 300b without interfering them), respectively.

A valve (electric valves or magnetic valves) 460 is provided at each of the refrigerant pipe 420. When the valve 460 is a magnetic valve, the valve 460 only opens and closes. Meanwhile, when the valve 460 is an electric valve, an opening degree of the valve 460 is also adjustable in addition to just open and close.

As a specific layout of the valves 460, the valve 460a is provided at the refrigerant pipe 420a between the joint portion of the refrigerant pipe 420*a* and the refrigerant pipe 420*c* and a joint portion of the refrigerant pipe 420*a* and the refrigerant pipe 420*d*. The valve 460*b* is provided at the refrigerant pipe 420*b* between the joint portion of the refrigerant pipe 420*b* and the refrigerant pipe 420*c* and a joint portion of the refrigerant pipe 420*b* and the refrigerant pipe 420*d*. The valve 460*c* is provided at the refrigerant pipe 420*c*. The valve 460*d* is provided at the refrigerant pipe 420*d*. The valve 460*e* is provided at the refrigerant pipe 420*a* between the joint portion of the refrigerant pipe 420*a* and refrigerant pipe 420*e* and a joint portion of the refrigerant pipe 420*a* and the refrigerant pipe 420*f*. The valve 460*f* is provided at the refrigerant pipe 420*b* between the joint portion of the refrigerant pipe 420*b* and the refrigerant pipe 420*e* and a joint portion of the refrigerant pipe 420*b* and the refrigerant pipe 420*f*. The valve 460*g* is provided at the refrigerant pipe 420*e*. The valve 460*h* is provided at the refrigerant pipe 420*f*.

The valves 460*a*, 460*b*, 460*e* and 460*f* are at the same open-close status. On the other hand, the valves 460*c*, 460*d*, 460*g* and 460*h* are at the same open-close status, which is opposite from the open-close status of the valves 460*a*, 460*b*, 460*e* and 460*f*. By alternately changing the open-close status of the valves 460*a*, 460*b*, 460*e* and 460*f* and the open-close status of the valves 460*c*, 460*d*, 460*g* and 460*h*, the direction of flow of the refrigerant 400 in the refrigerant circulation path 410 is alternately changed.

Components around the pumps 440*b* and 440*c* are similarly structured as those around the pumps 440*a* and 440*d*. Specifically, the structure around the pumps 440*b* and 440*c* becomes the structure of FIG. 2 in which the pumps 440*a* and 440*d* are substituted by the pumps 440*b* and 440*c*.

(Cable Temperature Measurement Device)

In this embodiment, the pipe type XLPE cable system 10 includes the cable temperature measurement device 600 that measures temperatures of the XLPE cable groups 200*a* and 200*b*, respectively. The cable temperature measurement device 600 is configured as an optical fiber temperature measurement device (DTS: Fiber-Optic Distributed Temperature Sensing System), and includes a temperature profile measurement unit (a DTS main unit) 610 and optical fibers 620, for example.

The optical fiber 620 is configured to function as a temperature sensor for measuring a temperature profile. The optical fibers 620 are provided to correspond to the XLPE cable groups 200*a* and 200*b*, respectively. Specifically, the optical fiber 620*a* is provided with the XLPE cable group 200*a* in the steel pipe for XLPE cable 300*a*. Meanwhile, the optical fiber 620*b* is provided with the XLPE cable group 200*b* in the steel pipe for XLPE cable 300*b*. One ends of the optical fibers 620*a* and 610*b* are connected to the temperature profile measurement unit 610.

For the OF cable system 90 of the comparative example 1 or the like, as there is a risk of leakage of the insulating oil 940 in the steel pipe for OF cable 930, it is impossible to insert the optical fiber 620 in the steel pipe for OF cable 930. On the other hand, in this embodiment, different from the OF cable system 90, the insulating oil 940 is not filled in the steel pipes for XLPE cable 300*a* and 300*b* and the refrigerant 400 is not filled therein as well, it is possible to insert the optical fibers 620*a* and 620*b* in the steel pipes for XLPE cable 300*a* and 300*b*, respectively.

The temperature profile measurement unit 610 is configured to measure temperature at a predetermined position in an axial direction of the optical fiber 620 by causing predetermined light to be injected into the optical fiber 620 and detecting Raman backscattering generated at the measurement position. Specifically, the temperature at the measurement position (diffusion position) is calculated based on a ratio of intensity of anti-Stokes ray with respect to intensity of Stokes ray at the measurement position. With this, the temperature at the measurement position in the axial direction in each of the XLPE cable groups 200*a* and 200*b* can be grasped.

(Control Unit)

Figure 5:
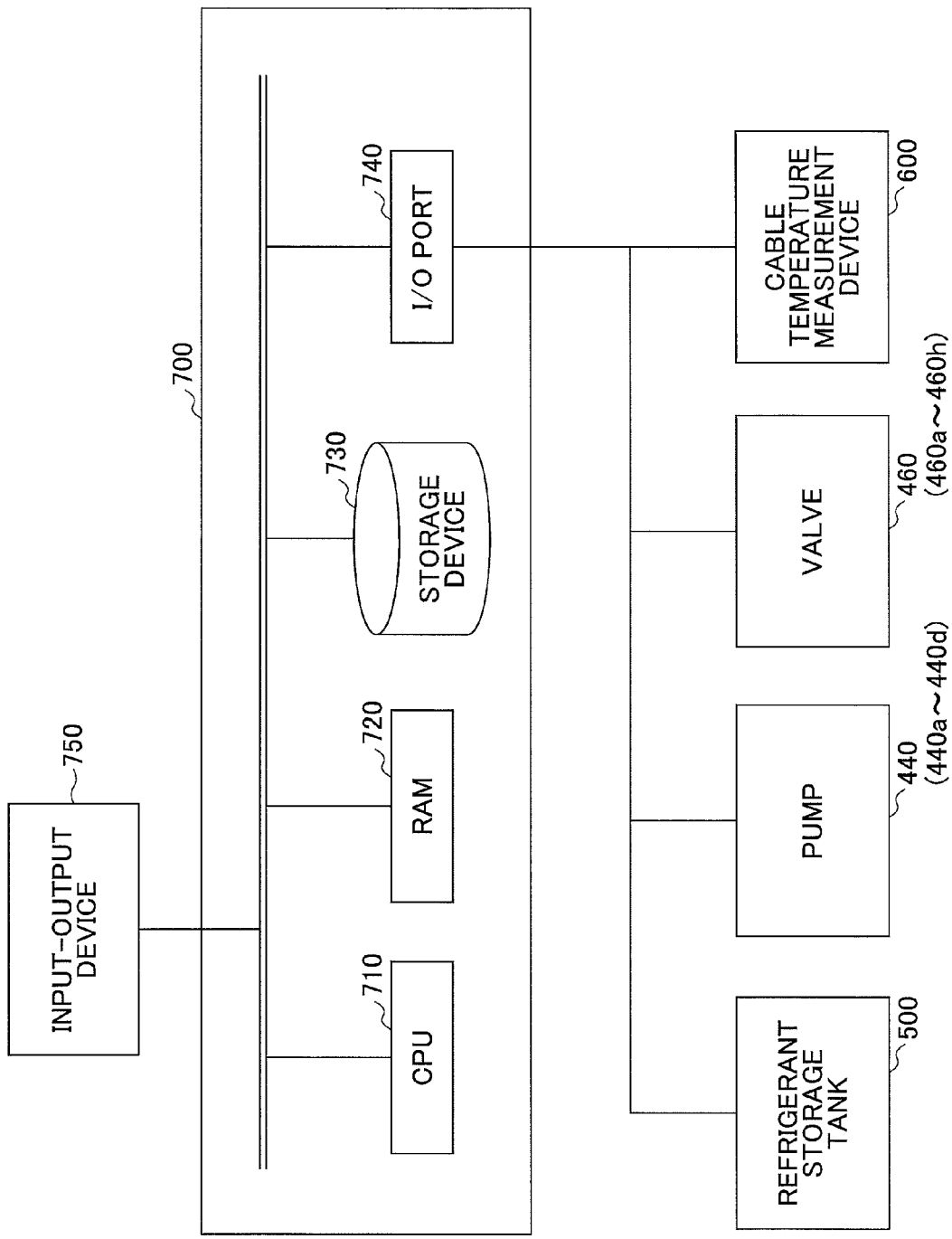
FIG. 5 is a block diagram schematically illustrating a structure of a control unit of the first embodiment.

The control unit 700 of the embodiment is described with reference to FIG. 5. FIG. 5 is a block diagram schematically illustrating an example of a structure of the control unit 700 of the embodiment. The control unit 700 is configured to control flow of the refrigerant 400. Specifically, the control unit 700 includes a CPU (Central Processing Unit) 710, a RAM (Random Access Memory) 720, a storage device 730 and an I/O port 740. The RAM 720, the storage device 730 and the I/O port 740 are configured to exchange data between the CPU 710 via an inner bus. The input-output device 750 is connected to the control unit 700.

The I/O port 740 is connected to the refrigerant storage tanks 500 (500*a* and 500*b*), the pumps 440 (440*a* to 440*d*), the valves 460 (460*a* to 460*h*) and the cable temperature measurement device 600.

The storage device 730 is configured to store various data or programs regarding controlling of the flow of the refrigerant 400. Specifically, the storage device 730 is configured as a HDD (Hard disk drive) or a SSD (Solid State Drive). For example, the storage device 730 is configured to store amounts of the refrigerant 400 flowing into the refrigerant storage tank 500 and flowing out from the refrigerant storage tank 500, temperature of the refrigerant 400 in the refrigerant storage tank 500, flow rate of the pump 440, temperature of the XLPE cable group 200 at respective position measured by the cable temperature measurement device 600 and the like to be capable of being read out.

The control unit 700 is configured to control the refrigerant storage tanks 500, the pumps 440, the valves 460 (refrigerant circulation path 410) and the like when the CPU 710 executes the predetermined program stored in the storage device 730. The method of cooling the pipe type XLPE cable system 10 by the control unit 700 is described later in detail.

The predetermined program for performing these processes are installed in the control unit 700. The predetermined program may be provided by being stored in a recording medium readable by the control unit 700, or may be provided to the control unit 700 via a communication network, prior to the installation.

The input-output device 750 is configured to output data for an administrator of the pipe type XLPE cable system 10 or the like, or input data from the administrator or the like, when necessary. Specifically, the input-output device 750 is configured as a touch panel including a liquid crystal display, an organic EL display or the like.

(2) Method of Constructing Pipe Type XLPE Cable System

Figure 6:
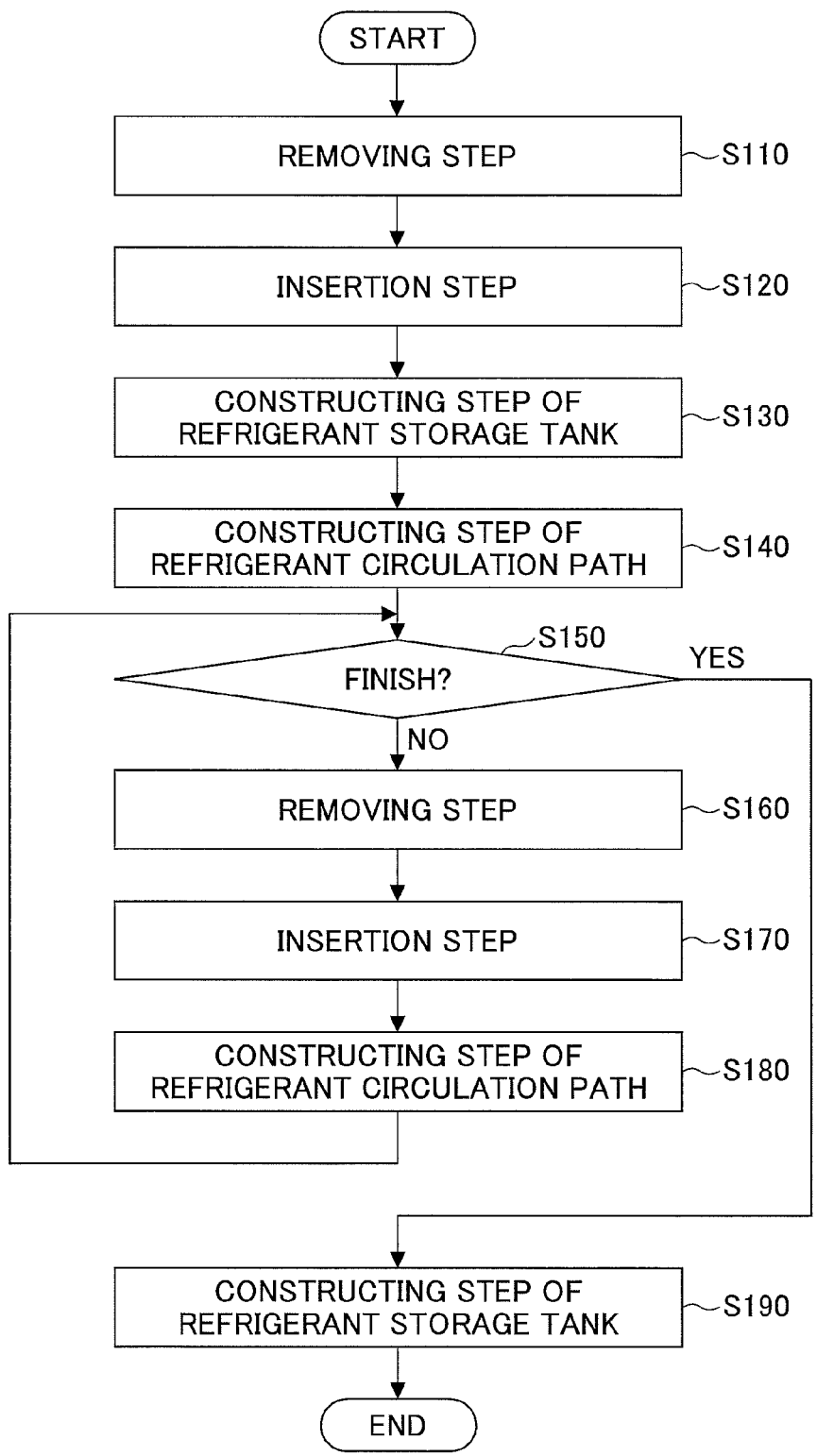
FIG. 6 is a flowchart of a method of constructing the pipe type solid insulation cable system of the first embodiment.
Figure 7:
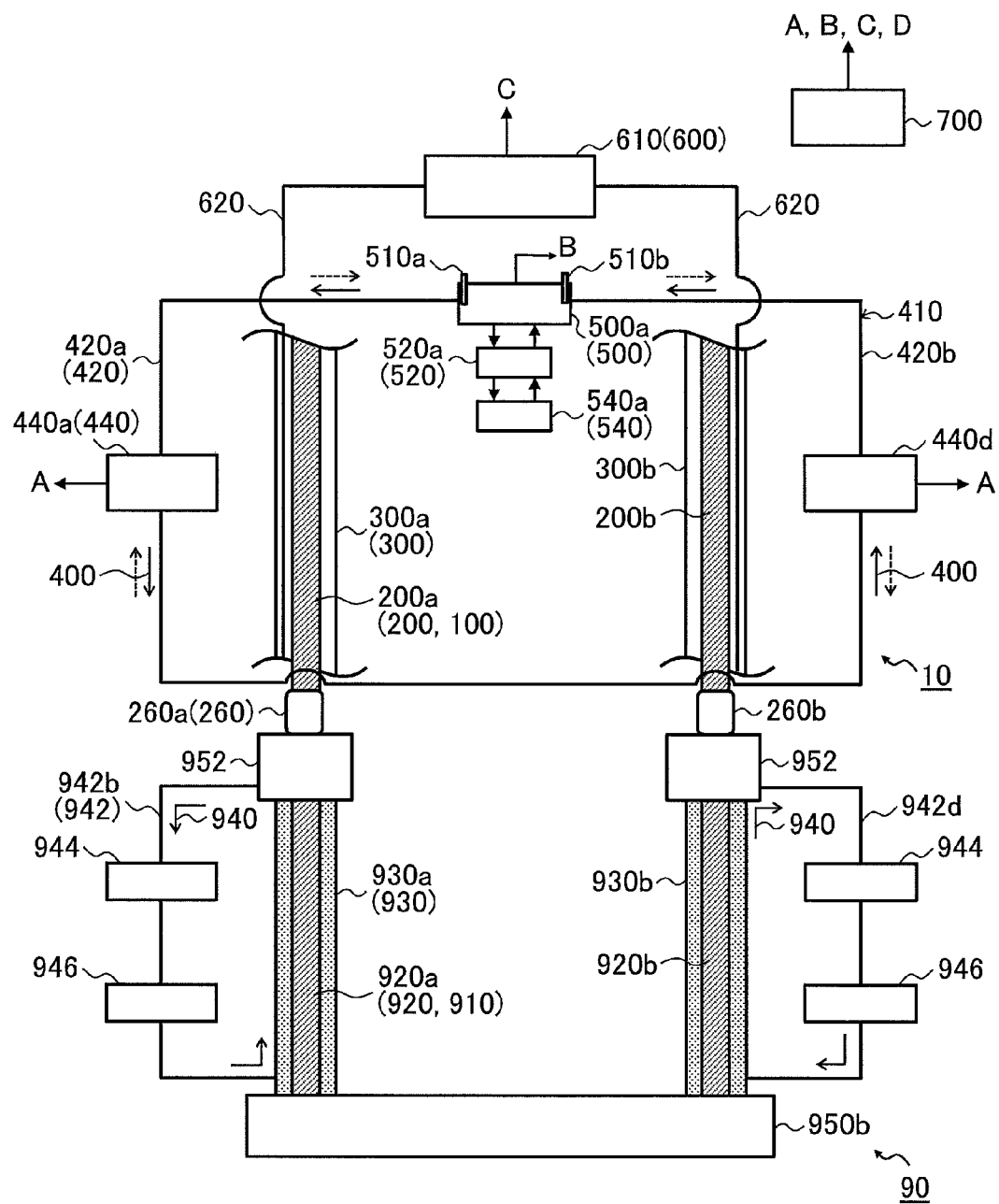
FIG. 7 is a plan view schematically illustrating a status in which the pipe type solid insulation cable system of the first embodiment and a previously provided pipe type oil filled cable system are included.

Next, with reference to FIG. 1 and FIG. 6 to FIG. 10, a method of constructing the pipe type XLPE cable system 10 of the embodiment is described. FIG. 6 is a flowchart illustrating the method of constructing the pipe type XLPE cable system 10 of the embodiment. In the following, "step" is abbreviated as "S". FIG. 7 is a plan view schematically illustrating in which the pipe type XLPE cable system 10 of the embodiment and the previously provided OF cable system 90 are included.

It is assumed that the OF cable system 90 illustrated in FIG. 10 is previously provided in a predetermined power transmission line. In this embodiment, the pipe type XLPE cable system 10 is constructed by substituting the previously provided OF cable system 90 by the following steps. Further, in this embodiment, the entirety of the previously provided OF cable system 90 is substituted by the pipe type XLPE cable system 10 by repeating a step of substituting a part of the previously provided OF cable system 90 by the pipe type XLPE cable system 10 while moving substituting position.

(S110: Removing Step)

First, compression to the insulating oil 940 by the pump station 950a is stopped, and the pumps 944 and the heat exchangers 946 connected to the oil circulation pipes 942a and 942c are stopped. Then, the insulating oil 940 is removed from the steel pipes for OF cable 930a and 930b between the pump station 950a and the back-flow diffusive valves 952, and the oil circulation pipes 942a and 942c connected to the steel pipes for OF cable 930a and 930b, respectively.

Next, the OF cable groups 920a and 920b inserted in the steel pipes for OF cable 930a and 930b between the pump station 950a and the back-flow diffusive valves 952 are cut at positions of the back-flow diffusive valves 952, respectively. Then, the OF cable groups 920a and 920b are removed from the steel pipes for OF cable 930a and 930b between the pump station 950a and the back-flow diffusive valves 952, respectively.

Next, inner portions of the steel pipes for OF cable 930a and 930b between the pump station 950a and the back-flow diffusive valves 952 and the oil circulation pipes 942a and 942c are washed.

Then, the pump station 950a from which the insulating oil 940 is removed, the two pumps 944 and the two heat exchangers 946 are dismounted. At this time, the steel pipes for OF cable 930a and 930b and the oil circulation pipes 942a and 942c are left.

Further, at this time, the back-flow diffusive valves 952 are also left, and the oil circulation pipes 942b and 942d are connected to the back-flow diffusive valves 952, respectively. With this, circulations of the insulating oil 940 in the left steel pipes for OF cable 930a and 930b between the pump station 950b and the back-flow diffusive valves 952 and the oil circulation pipes 942b and 942d, respectively, are maintained.

(S120: Insertion Step)

Next, as illustrated in FIG. 7, the steel pipes for OF cable 930a and 930b, from which the insulating oil 940 and the OF cable groups 920a and 920b are removed, are diverted to the steel pipes for XLPE cable 300a and 300b, respectively. Then, the XLPE cable groups 200a and 200b are newly inserted in the steel pipes for XLPE cable 300a and 300b, respectively.

At this time, the newly provided XLPE cable groups 200 are connected to the left OF cable groups 920 via transition joints 260, respectively. Specifically, the XLPE cables 100a to 100c that constitute the newly provided XLPE cable group 200a are connected to the OF cables 910a to 910c that constitute the left OF cable group 920a via the transition joints 260a, respectively. Similarly, the XLPE cables 100a to 100c that constitute the newly provided XLPE cable group 200b are connected to the OF cables 910a to 910c that constitute the left OF cable group 920b via the transition joints 260b, respectively.

Further, at this time, the optical fibers 620a and 620b that constitute the cable temperature measurement device 600 are provided to extend along the XLPE cable groups 200a and 200b, respectively. Then, one ends of the optical fibers 620a and 620b are connected to the temperature profile measurement unit 610, respectively.

(S130: Constructing Step of Refrigerant Storage Tank)

Next, the refrigerant storage tank 500a, the chiller 520a and the heat exchanger 540a are provided at one end of each of the steel pipes for XLPE cable 300a and 300b (one end of each of the refrigerant pipes 420a and 420b, which will be described later).

(S140: Constructing Step of Refrigerant Circulation Path)

Next, as illustrated in FIG. 7, the oil circulation pipes 942a and 942c, from which the insulating oil 940 is removed, are diverted to the refrigerant pipes 420a and 420b, respectively. Then the refrigerant pipes 420a and 420b are circularly connected by introducing new refrigerant pipes 420 between the refrigerant pipes 420a and 420b diverted from the oil circulation pipes 942a and 942c. At this time, the refrigerant pipes 420a and 420b and the steel pipes for XLPE cable 300a and 300b are not connected. With this, the refrigerant circulation path 410 of the embodiment is constructed.

Next, the pumps 440a and 440d are provided in the refrigerant pipes 420a and 420b, respectively. Then, the refrigerant circulation path 410 is connected to both ends of the refrigerant storage tank 500a. With this, the refrigerant 400 can be circularly circulated.

Further, at this time, as illustrated in FIG. 2, the refrigerant pipes 420c to 420f are connected to each of the refrigerant pipes 420a and 420b around the pumps 440a and 440b by passing through the steel pipes for XLPE cable 300a and 300b (by stepping over the steel pipes for XLPE cable 300a and 300b without interfering them), respectively. Further, the valves 460a to 460d are provided at the refrigerant pipes 420a to 420d, respectively, and the valves 460e to 460h are provided at the refrigerant pipes 420a, 420b, 420e and 420f, respectively.

With the above configuration, as illustrated in FIG. 7, a part of the previously provided OF cable system 90 is substituted by the pipe type XLPE cable system 10.

(S150: Determine Whether to Finish)

Thereafter, whether to finish the substitution to the pipe type XLPE cable system 10 from the previously provided OF cable system 90 is determined.

(S160 to S180)

Under a status illustrated in FIG. 7, the previously provided OF cable system 90 is remained. In such a case, it is determined that the substitution to the pipe type XLPE cable system 10 from the previously provided OF cable system 90 is not finished (NO of S150), and a removing step S160, an insertion step S170 and a refrigerant circulation path constructing step S180 that are similar to the removing step S110, the insertion step S120 and the refrigerant circulation path constructing step S140, respectively, are performed for at least a part of the remaining OF cable system 90.

After finishing the refrigerant circulation path constructing step S180, whether to finish the substitution to the pipe type XLPE cable system 10 from the previously provided OF cable system 90 is determined again (S150). If the previously provided OF cable system 90 remains, and the substitution to the pipe type XLPE cable system 10 from the previously provided OF cable system 90 is not finished (NO of S150), and the removing step S160, the insertion step S170 and the refrigerant circulation path constructing step S180 are repeated for at least a part of the remaining OF cable system 90.

As such, by repeating the removing step S160, the insertion step S170 and the refrigerant circulation path constructing step S180 while moving substituting position, at which the substitution to the pipe type XLPE cable system 10 from the previously provided OF cable system 90 is performed, in order, the entire length of the OF cable system 90 is substituted by the pipe type XLPE cable system 10.

(S190: Constructing Step of Refrigerant Storage Tank)

Then, when the entirety of the OF cable system 90 is substituted by the pipe type XLPE cable system 10, and the removing step S160, the insertion step S170 and the refrigerant circulation path constructing step S180 are finished (YES of S150), as illustrated in FIG. 1, the refrigerant storage tank 500b, the chiller 520b and the heat exchanger 540b are provided at the other end of each of the steel pipes for XLPE cable 300a and 300b (the other end of each of the refrigerant pipes 420a and 420b). Then, the refrigerant circulation path 410 is connected to both ends of the refrigerant storage tank 500b. With this, the refrigerant 400 can be circularly circulated.

With the above configuration, the constructing step of the pipe type XLPE cable system 10 is finished.

(3) Method of Cooling Pipe Type XLPE Cable System

Next, with reference to FIG. 1, a method of cooling the pipe type XLPE cable system 10 of the embodiment is described. In the following description, the operations of the pumps 440 or the like are controlled by the control unit 700.

As illustrated in FIG. 1, in order to cool the pipe type XLPE cable system 10 of the embodiment by the refrigerant circulation path 410, first, the refrigerant storage tanks 500, the chillers 520 and the heat exchangers 540 are operated, and the refrigerant 400 cooled to be predetermined temperature is stored in the refrigerant storage tanks 500. Next, the tank pumps of the refrigerant storage tanks 500 and the pumps 440a to 440d are operated to circulate the refrigerant 400 in the refrigerant circulation path 410 in a predetermined direction.

At this time, by circulating the refrigerant 400 in the refrigerant circulation path 410 without causing the refrigerant 400 to flow in the steel pipes for XLPE cable 300a and 300b, at least a part of periphery of each of the steel pipes for XLPE cable 300a and 300b is cooled by the refrigerant circulation path 410. With this, air in each of the steel pipes for XLPE cable 300 is also cooled in addition to that each of the steel pipes for XLPE cable 300 itself is cooled. Then, as the air in each of the steel pipes for XLPE cable 300 moves, the entire temperature in each of the steel pipes for XLPE cable 300 is lowered to predetermined temperature. As a result, the XLPE cables 100 in each of the steel pipes for XLPE cable 300 can be indirectly cooled.

Further, in this embodiment, for example, the direction of flow of the refrigerant 400 in the refrigerant circulation path 410 is alternately changed every predetermined period. For example, the direction of flow of the refrigerant 400 is changed every day.

Specifically, when alternately changing the direction of flow of the refrigerant 400, first, the tank pumps of the refrigerant storage tanks 500 are stopped. Then, the refrigerant pipe 420 previously connected to the outflow port of the refrigerant storage tank 500 is connected to the inflow port of the refrigerant storage tank 500, and the refrigerant pipe 420 previously connected to the inflow port of the refrigerant storage tank 500 is connected to the outflow port of the refrigerant storage tank 500 by the switching valve of the refrigerant storage tank 500, in each of the refrigerant storage tanks 500. Thereafter, the tank pumps of the refrigerant storage tanks 500 are restarted. This means that the direction of flow of the refrigerant 400 in the refrigerant circulation path 410 is changed while maintaining the direction of flow of the refrigerant 400 in each of the refrigerant storage tanks 500. With this, the cooling efficiency of the refrigerant 400 can be maintained while maintaining the temperature profile (temperature gradient) of the refrigerant 400 in the refrigerant storage tank 500.

When alternately changing the direction of flow of the refrigerant 400, among the plurality of refrigerant pipes 420, upstream of the pump 440 is connected to downstream of the pump 440, and downstream of the pump 440 is connected to upstream of the pump 440. Specifically, when alternately changing the direction of flow of the refrigerant 400, among the plurality of refrigerant pipes 420, upstream of one of the pumps 440 is connected to downstream of the other of the pumps 440, and downstream of the one of the pumps 440 is connected to upstream of the other of the pumps 440.

Furthermore specifically, as illustrated in FIG. 2, before changing the direction of flow of the refrigerant 400, the valves 460a, 460b, 460e and 460f are at the same open-close status. On the other hand, the valves 460c, 460d, 460g and 460h are at the same open-close status, which is opposite from the open-close status of the valves 460a, 460b, 460e and 460f. For example, the valves 460a, 460b, 460e and 460f are opened while the valves 460c, 460d, 460g and 460h are closed. With this, the refrigerant 400 circulates in the refrigerant circulation path 410 in a direction same as a direction (illustrated by arrows in a solid line) in which the pumps 440a and 440d transmit the refrigerant 400. The valves 460 around the pumps 440b and 440c are similarly structured as the valves 460 around the pumps 440a and 440d.

When the direction of flow of the refrigerant 400 is alternately changed, first, the pumps 440a to 440d are stopped. Next, the open-close status of the valves 460a, 460b, 460e and 460f and the open-close status of the valves 460c, 460d, 460g and 460h are alternately changed to opposite statuses. For example, the valves 460a, 460b, 460e and 460f, which are previously opened, are closed, and the valves 460c, 460d, 460g and 460h, which are previously closed, are opened. The valves 460 around the pumps 440b and 440c are similarly changed as the valves 460 around the pumps 440a and 440d. Next, the pumps 440a to 440d are restarted.

With this, around the pumps 440a and 440d, the refrigerant 400 flows in the refrigerant pipes 420c and 420d such that to cross with each other, and the refrigerant 400 flows in the refrigerant pipes 420e and 420f such that to cross with each other. Then, except the parts of the refrigerant circulation path 410 near the pumps 440a and 440d, the refrigerant 400 is circulated in a direction (illustrated by arrows in a dotted line) that is opposite to the direction in which the pumps 440a and 440d transmit the refrigerant 400. Flow of the refrigerant 400 near the pumps 440b and 440c is the same as that near the pumps 440a and 440d. As such, the direction of flow of the refrigerant 400 in the refrigerant circulation path 410 can be changed while maintaining the direction of the refrigerant 400 transmitted by each of the pumps 440.

By performing a series of steps including stopping of the tank pumps of the refrigerant storage tanks 500, changing of the switching valves and restarting of the tank pumps, and a series of steps including stopping of the pumps 440 in the refrigerant circulation path 410, changing of the valves 460 and restarting of the pumps 440 at the same time, the direction of flow of the refrigerant 400 can be smoothly changed.

When cooling the pipe type XLPE cable system 10 using the circular refrigerant circulation path 410 of the embodiment, the temperature of the refrigerant 400 at upstream near the outflow port of the refrigerant storage tank 500 tends to be lower, while the refrigerant 400 at downstream near the inflow port of the refrigerant storage tank 500 tends to be higher, in the refrigerant circulation path 410. Thus, for the XLPE cable groups 200a and 200b, cooling efficiency is good for upstream portions near the outflow port of the refrigerant storage tank 500, while cooling efficiency is bad for downstream portions near the inflow port of the refrigerant storage tank 500. Thus, as described above, by alternately changing the direction of flow of the refrigerant 400 in the refrigerant circulation path 410, the refrigerant 400 at a portion at which the temperature of the refrigerant 400 is high can be lowered in the refrigerant circulation path 410. This means that the entirety of the temperature in the refrigerant circulation path 410 can be made equal. As a result, the XLPE cable groups 200a and 200b can be equally cooled.

At this time, for example, the temperature of the refrigerant 400 flowing out from the refrigerant storage tank 500 is set to be lower than predetermined temperature (target temperature) of the XLPE cable 100. With this, upstream near the outflow port of the refrigerant storage tank 500 becomes supercooled and downstream near the inflow port of the refrigerant storage tank 500 becomes a status at which cooling is not enough. As the soil tends to accumulate heat, temperature of the soil at a portion of the upstream near the outflow port of the refrigerant storage tank 500 that is supercooled, and temperature of the soil at a portion of the downstream near the inflow port of the refrigerant storage tank 500 that is not cooled enough are maintained for a predetermined period. Thus, by alternately changing the direction of flow of the refrigerant 400 in the refrigerant circulation path 410, the temperature of the portion of the soil that is supercooled is gradually increased, while the temperature of the portion of the soil at which the cooling is not enough is gradually lowered. With this, the temperature at the soil around the entirety of the refrigerant circulation path 410 can be made equal at desired temperature. As a result, the entirety of the XLPE cable groups 200 in the steel pipes for XLPE cable 300, respectively, can be cooled to be desired temperature via the soil whose temperature is uniformly maintained.

The direction of flow of the refrigerant 400 may not be changed every predetermined period. For example, the direction of flow of the refrigerant 400 in the refrigerant circulation path 410 may be alternately changed when a difference between temperatures of the XLPE cable groups 200a and 200b in an axial direction measured by the cable temperature measurement device 600 is greater than or equal to a predetermined value. The difference between temperatures of the XLPE cable groups 200a and 200b in the axial direction means, for example, that a different between temperature at upstream of the refrigerant circulation path 410 and temperature at downstream of the refrigerant circulation path 410 in the XLPE cable group 200a, for example. Even when the difference in temperatures in the axial direction of each of the XLPE cable groups 200a and 200b becomes large, by immediately changing the direction of flow of the refrigerant 400, the XLPE cable groups 200a and 200b can be uniquely cooled, and the difference in temperatures generated in the axial direction of each of the XLPE cable groups 200a and 200b can be reduced.

Further, in this embodiment, for example, a flow rate of the refrigerant 400 in each of the tank pumps in the refrigerant storage tanks 500 and in the pumps 440a to 440d is adjusted based on the temperature of each of the XLPE cable groups 200a and 200b measured by the cable temperature measurement device 600. For example, the flow rate of the refrigerant 400 is adjusted based on the temperature of a portion (hot spot) at which the temperature is the highest in the XLPE cable groups 200a and 200b. Specifically, the flow rate of the refrigerant 400 is increased when the temperature of the hot spot is greater than or equal to a predetermined value. With this, the hot spot can be appropriately cooled and the XLPE cables 100 composing the XLPE cable groups 200a and 200b are suppressed from being high temperature that exceeds allowable temperature.

Further, in this embodiment, for example, flow rate of the refrigerant 400 in the tank pump and the pumps 440a to 440d in the refrigerant storage tank 500 is adjusted based on the temperature of the refrigerant 400 in each of the refrigerant storage tanks 500 measured by the refrigerant temperature measurement unit 510 in the respective refrigerant storage tank 500. Specifically, when a difference between the temperature of the refrigerant 400 that is flowing out from the refrigerant storage tank 500 measured by the outflow port refrigerant temperature measurement unit 510a, and the temperature of the refrigerant 400 that is flowing into the refrigerant storage tank 500 measured by the inflow port refrigerant temperature measurement unit 510b is greater than or equal to a predetermined value, the flow rate of the refrigerant 400 is increased. For example, when the temperature of the refrigerant 400 that is flowing out from the refrigerant storage tank 500 is 10° C., and the temperature of the refrigerant 400 that is flowing into the refrigerant storage tank 500 is 40° C., it is determined that the amount of heat corresponding to the temperature difference 30° C. is absorbed by the refrigerant 400. Thus, in such a case, it is determined that the amount of heat absorbed by the refrigerant 400 by the circulation of the refrigerant 400 in the refrigerant circulation path 410 is large, and the temperatures of the XLPE cables 100 that compose the XLPE cable groups 200a and 200b are increased, and the flow rate of the refrigerant 400 is increased. With this, the flow rate of the refrigerant 400 can be immediately adjusted based on the temperature of the refrigerant 400 itself, and the XLPE cable groups 200a and 200b can be efficiently cooled.

When the above conditions are satisfied, the temperature of the refrigerant 400 in the refrigerant storage tank 500 may be lowered in addition to adjusting the flow rate of the refrigerant 400.

(4) Effects of Embodiment

According to the present embodiment, following effects can be obtained.

(a) The refrigerant circulation path 410 is constructed by circularly connecting the plurality of refrigerant pipes 420 that are provided to be adjacent to the plurality of steel pipes for XLPE cable 300, respectively. By circulating the refrigerant 400 in the refrigerant circulation path 410 without flowing the refrigerant 400 in the steel pipe for XLPE cable 300, at least a part of the soil around each of the steel pipes for XLPE cable 300 can be cooled by the refrigerant circulation path 410. With this, the XLPE cable groups 200a and 200b in the steel pipes for XLPE cable 300a and 300b, respectively, can be indirectly cooled via the soil. As such, according to the embodiment, as the refrigerant 400 does not flow in the steel pipe for XLPE cable 300, it is unnecessary to provide a specific sealing structure for the steel pipe for XLPE cable 300, and the pipe type XLPE cable system 10 can be simply structured. As a result, the XLPE cables 100 can be easily cooled.

(b) As the refrigerant 400 does not flow in the steel pipe for XLPE cable 300, it is possible to take out a pair of the XLPE cables 100 inserted in the steel pipe for XLPE cable 300 from the steel pipe for XLPE cable 300 and easily connect the pair XLPE cables 100 in an axial direction. For example, by connecting the pair of XLPE cables 100 in one of manholes (not illustrated in the drawings) that are provided with a predetermined space in an axial direction of the steel pipe for XLPE cable 300, and forming a flexure of the XLPE cable 100, which is called as offset, around a joint portion in the respective manhole, it is easy to perform the connecting operation and the joint portion can be stably fixed.

(c) As it is unnecessary to seal the steel pipe for XLPE cable 300, expansion and contraction of the XLPE cable 100 in the axial direction in the steel pipe for XLPE cable 300 due to the Joule heat generated when energizing can be allowed. Further, as the stress due to the expansion and contraction of the XLPE cable 100 is not applied on the refrigerant circulation path 410, sealing of the refrigerant 400 in the refrigerant circulation path 410 can be maintained. In other words, even when the XLPE cable 100 expands and contracts, the leakage of the refrigerant 400 from the refrigerant circulation path 410 can be suppressed.

(d) Even when the refrigerant 400 leaks from the refrigerant circulation path 410, it is possible to detect the leakage of the refrigerant 400 early by confirming a difference between an amount of the refrigerant 400 flowing out from the refrigerant circulation path 410 and an amount of the refrigerant 400 flowing in the refrigerant circulation path 410. In other words, the leakage of the refrigerant 400 can be easily managed.

(e) As described above, by adopting the indirect cooling method, an electric power transmission system of the XLPE cable 100 and a refrigerant circulating system by the refrigerant circulation path 410 are separated. With this, when maintenance is necessary for one of the electric power transmission system and the refrigerant circulating system, the maintenance for the one of the systems can be performed without influencing the other of the systems. Thus, it is possible to easily maintain and manage the pipe type XLPE cable system 10.

(f) In this embodiment, the pipe type XLPE cable system 10 is constructed by substituting the previously provided OF cable system 90. At this time, the steel pipes for OF cable 930 of the previously provided OF cable system 90 is diverted as the steel pipe for XLPE cable 300 in which the XLPE cable 100 is inserted. Further, the plurality of oil circulation pipes 942 of the previously provided OF cable system 90 are diverted as the plurality of refrigerant pipes 420, and the refrigerant circulation path 410 is constructed by circularly connecting the plurality of refrigerant pipes 420. With this, cost for constructing the pipe type XLPE cable system 10 can be lowered and the pipe type XLPE cable system 10 can be immediately constructed.

(g) When constructing the pipe type XLPE cable system 10, by repeating a step of substituting a part of the previously provided OF cable system 90 by the pipe type XLPE cable system 10 while moving substituting position, at which the substitution to the pipe type XLPE cable system 10 from the previously provided OF cable system 90 is performed, in order, the entire length of the OF cable system 90 is substituted by the pipe type XLPE cable system 10. If the entire length of the previously provided OF cable system 90 is substituted by the pipe type XLPE cable system 10 at once, there is a possibility that downtime of the transmission of the electric power becomes long. On the other hand, when the previously provided OF cable system 90 is step-wisely substituted by the pipe type XLPE cable system 10 as described in the embodiment, the substituting operation of the system can be performed while leaving an area at which the electric power can be transmitted. Thus, downtime of the transmission of the electric power to a predetermined position can be made short.

(h) According to the pipe type XLPE cable system 10 of the embodiment, the control unit 700 alternately changes the direction of flow of the refrigerant 400 in the refrigerant circulation path 410 at predetermined timing when cooling the pipe type XLPE cable system 10 by the refrigerant circulation path 410. With this, the temperature of the refrigerant 400 at a portion in the refrigerant circulation path 410 at which the temperature of the refrigerant 400 was high can be lowered. This means that the temperature of the entirety of the refrigerant circulation path 410 can be made uniform. As a result, the XLPE cable groups 200a and 200b can be equally cooled.

Here, as a reference, for example, when a pair of steel pipes for XLPE cable and a pair of refrigerant pipes are provided in a single cavity tunnel, as the cooled air moves in the tunnel, the XLPE cable groups in both of the steel pipes for XLPE cable can be cooled by one of the refrigerant pipes. In other words, difference in temperature hardly occurs between upstream near an outflow port of a refrigerant storage tank and downstream near an inflow port of the refrigerant storage tank, compared with a case in the ground. On the other hand, when a pair of the steel pipes for XLPE cable 300 and a pair of refrigerant pipes 420 that constitute the refrigerant circulation path 410 are buried in the ground, as the embodiment, the effect of the convection as in the air cannot be obtained. This means that one of the refrigerant pipes 420 can only cool the XLPE cable groups 200 in the steel pipe for XLPE cable 300 that is adjacent to the respective refrigerant pipe 420. In other words, difference in temperature easily occurs between upstream near the outflow port of the refrigerant storage tank 500 and downstream near the inflow port of the refrigerant storage tank 500. Thus, by alternately changing the direction of flow of the refrigerant 400 in the refrigerant circulation path 410, it is possible to make the difference in temperature small between upstream near the outflow port of the refrigerant storage tank 500 and downstream near the inflow port of the refrigerant storage tank 500. Thus, the method of alternately changing the direction of flow of the refrigerant 400 is particularly effective when the steel pipe for XLPE cable 300 and the refrigerant circulation path 410 are buried in the soil.

(Second Embodiment)

Next, a second embodiment is described.

In the pipe type XLPE cable system 12 of the embodiment, the number of the XLPE cable groups is different from that in the pipe type XLPE cable system 10 of the first embodiment. Hereinafter, the same components described in the first embodiment are given the same reference numerals, and only the different prats are explained.

The pipe type XLPE cable system 12 of the embodiment is configured by substituting a previously provided OF cable system 92 of a comparative example 2, which will be described below, for example. Before describing the pipe type XLPE cable system 12 of the embodiment, the OF cable system 92 of the comparative example 2 is described.

(1) OF cable system of comparative example 2

Figure 13:
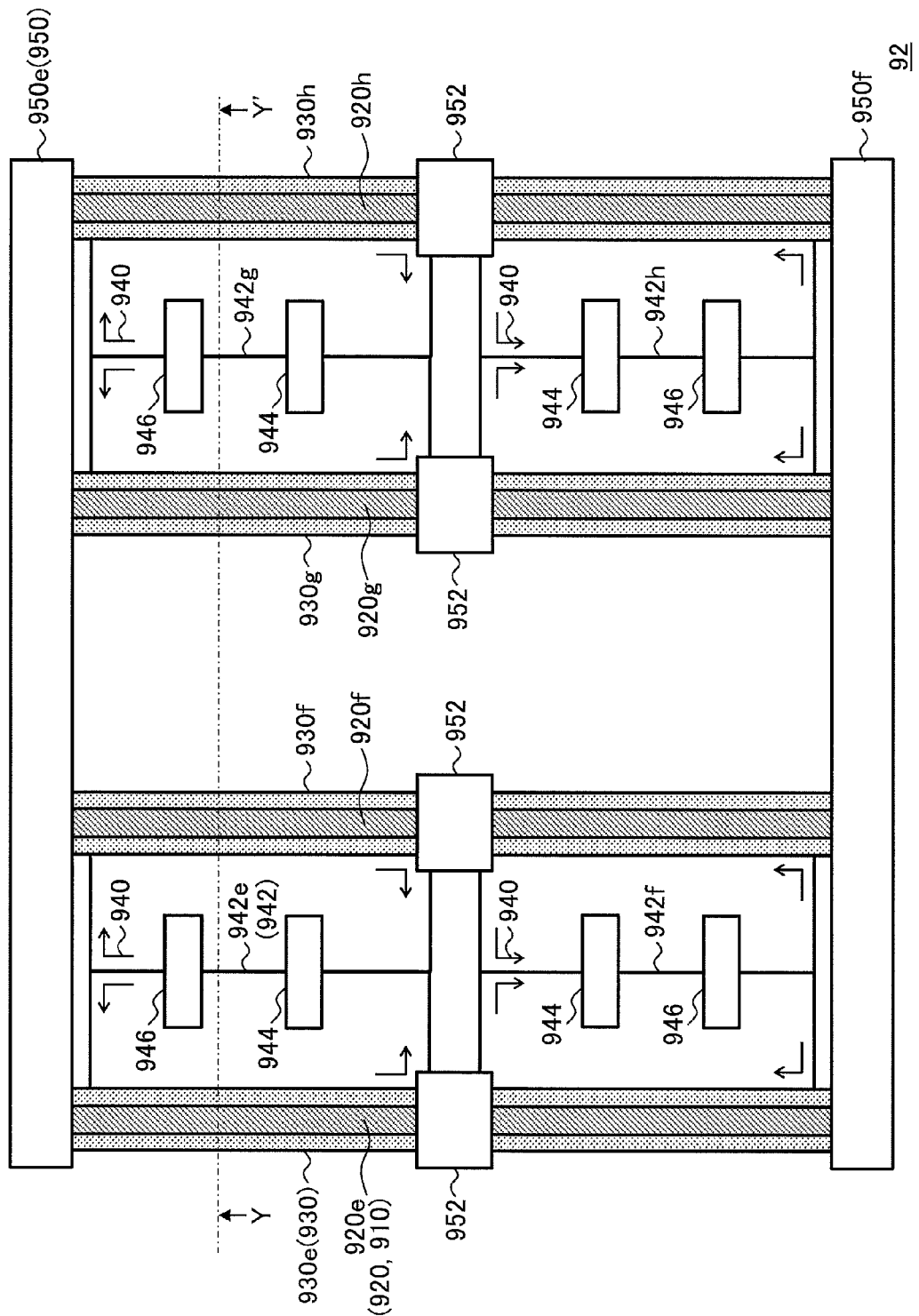
FIG. 13 is a plan view schematically illustrating a pipe type oil filled cable system of a comparative example 2.
Figure 14:
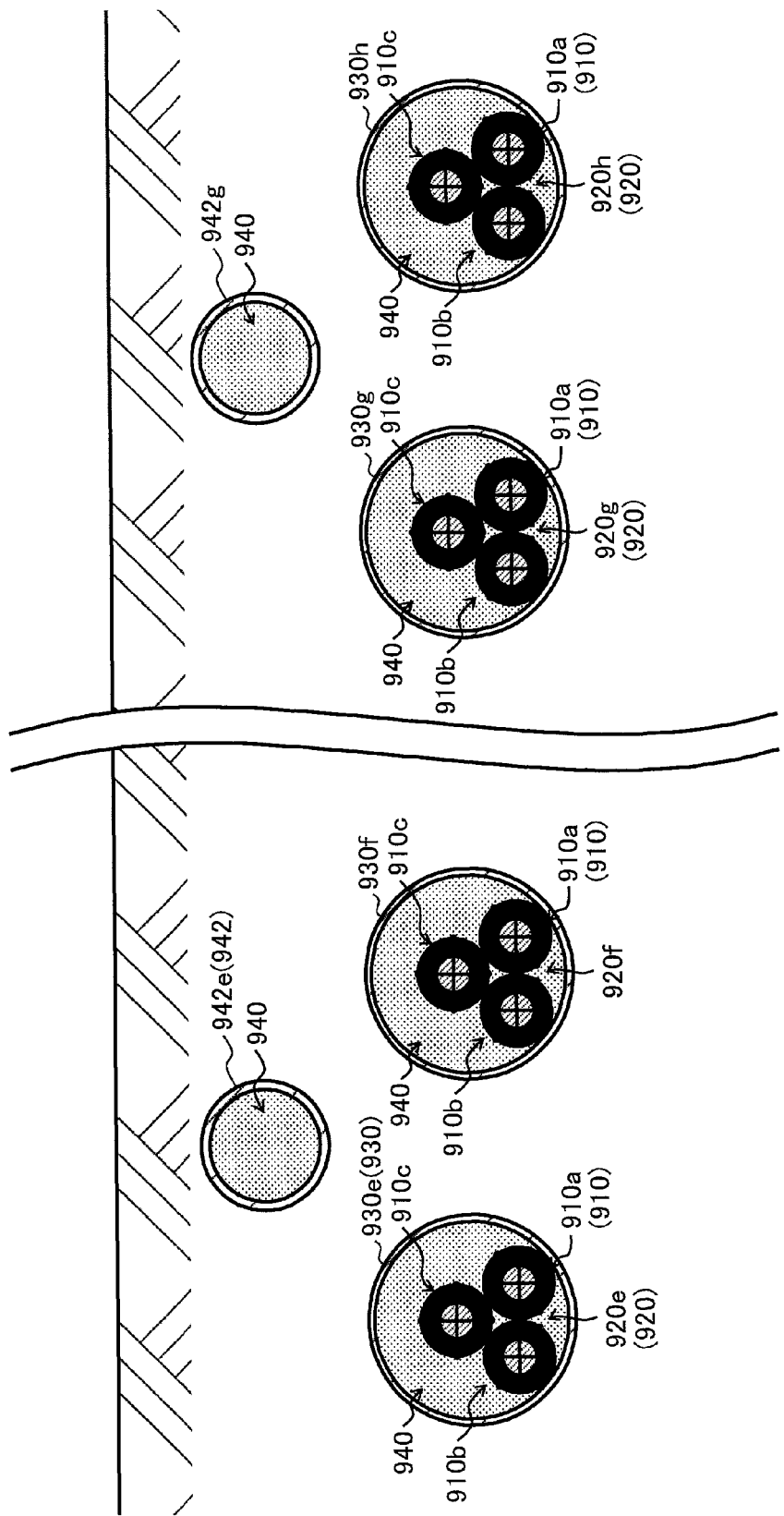
FIG. 14 is a cross-sectional view illustrating the pipe type oil filled cable system of the comparative example 2.

With reference to FIG. 13 and FIG. 14, as a conventional example, an OF cable system of a comparative example 2 is described. FIG. 13 is a plan view schematically illustrating the OF cable system 92 of the comparative example 2. FIG. 14 is a cross-sectional view illustrating the OF cable system 92 of the comparative example 2. FIG. 14 is a cross-sectional view of FIG. 13 taken along a Y-Y' line.

As illustrated in FIG. 13 and FIG. 14, the OF cable system 92 of the comparative example 2 is configured to draw four lines of the OF cable groups 920, for example. Specifically, four steel pipe for OF cable 930 (930e to 930h) are buried in the ground. The steel pipes for OF cable 930e to 930h are placed to be apart from each other with a predetermined distance in a horizontal direction. For example, the steel pipes for OF cable 930g and 930h are provided at an opposite side of the steel pipes for OF cable 930e and 930f while interposing a road on which vehicles pass therebetween. The steel pipes for OF cable 930e to 930h are extending in the same direction. OF cable groups 920e to 920h are inserted in each of the steel pipes for OF cable 930e to 930h.

A pair of the pump stations 950 are provided, for example. Specifically, the pump station 950e is connected to one ends of the steel pipes for OF cable 930e to 930h, and the pump station 950f is connected to the other ends of the steel pipes for OF cable 930e to 930h.

The back-flow diffusive valves 952 are respectively connected to the steel pipes for OF cable 930e to 930h at an intermediate position between the two pump stations 950, for example.

The oil circulation pipe 942 is provided to correspond to each of the steel pipes for OF cable 930. Specifically, the oil circulation pipe 942e is provided to be adjacent to the steel pipes for OF cable 930e and 930f with a predetermined distance from the steel pipes for OF cable 930e and 930f between the steel pipes for OF cable 930e and 930f, respectively. Meanwhile, the oil circulation pipe 942g is provided to be adjacent to the steel pipes for OF cable 930g and 930h with a predetermined distance from the steel pipes for OF cable 930g and 930h between the steel pipes for OF cable 930g and 930h, respectively.

The oil circulation pipe 942 is configured to separately circulate the insulating oil 940 for every predetermined distance in an axial direction of the steel pipe 930. Specifically, the oil circulation pipe 942e is circularly connected to each of the steel pipes for OF cable 930e and 930f between the pump station 950e and the back-flow diffusive valve 952. One end of the oil circulation pipe 942e is connected to the back-flow diffusive valves 952. The pump 944 and the heat exchanger 946 are provided at the oil circulation pipe 942e in this order from a back-flow diffusive valve 952 side. With this configuration, the insulating oil 940 is configured to circulate in a direction from the pump station 950e to the respective back-flow diffusive valve 952 in each of the steel pipes for OF cable 930e and 930f between the pump station 950e and the back-flow diffusive valves 952 via the oil circulation pipe 942e.

Meanwhile, the oil circulation pipe 942f is provided on a line that extends from the oil circulation pipe 942e, for example. The pump 944 and the heat exchanger 946 connected to the oil circulation pipe 942f are symmetrically provided with the pump 944 and the heat exchanger 946 connected to the oil circulation pipe 942e while interposing the back-flow diffusive valves 952 therebetween. With this configuration, the insulating oil 940 is configured to circulate in a direction from the pump station 950f to the respective back-flow diffusive valve 952 in each of the steel pipes for OF cable 930e and 930f between the pump station 950f and the back-flow diffusive valves 952 via the oil circulation pipe 942f.

Similarly, the oil circulation pipe 942 is configured to separately circulate the insulating oil 940 in each of the steel pipes for OF cable 930e and 930f and the steel pipes for OF cable 930g and 930h. Specifically, the oil circulation pipes 942g and 942h are circularly connected to each of the steel pipes for OF cable 930g and 930h, separately from the oil circulation pipes 942e and 942f connected to the steel pipes for OF cable 930e and 930f, in such a manner to be symmetrically to the oil circulation pipes 942e and 942f connected to the steel pipes for OF cable 930e and 930f. With this configuration, the insulating oil 940 is configured to circulate in a direction from the pump station 950e to the respective back-flow diffusive valve 952 in each of the steel pipes for OF cable 930g and 930h between the pump station 950e and the back-flow diffusive valves 952 via the oil circulation pipe 942g. The insulating oil 940 is configured to circulate in a direction from the pump station 950f to the respective back-flow diffusive valve 952 in each of the steel pipes for OF cable 930g and 930h between the pump station 950f and the back-flow diffusive valves 952 via the oil circulation pipe 942h.

(2) Pipe Type XLPE Cable System of Embodiment

Figure 8:
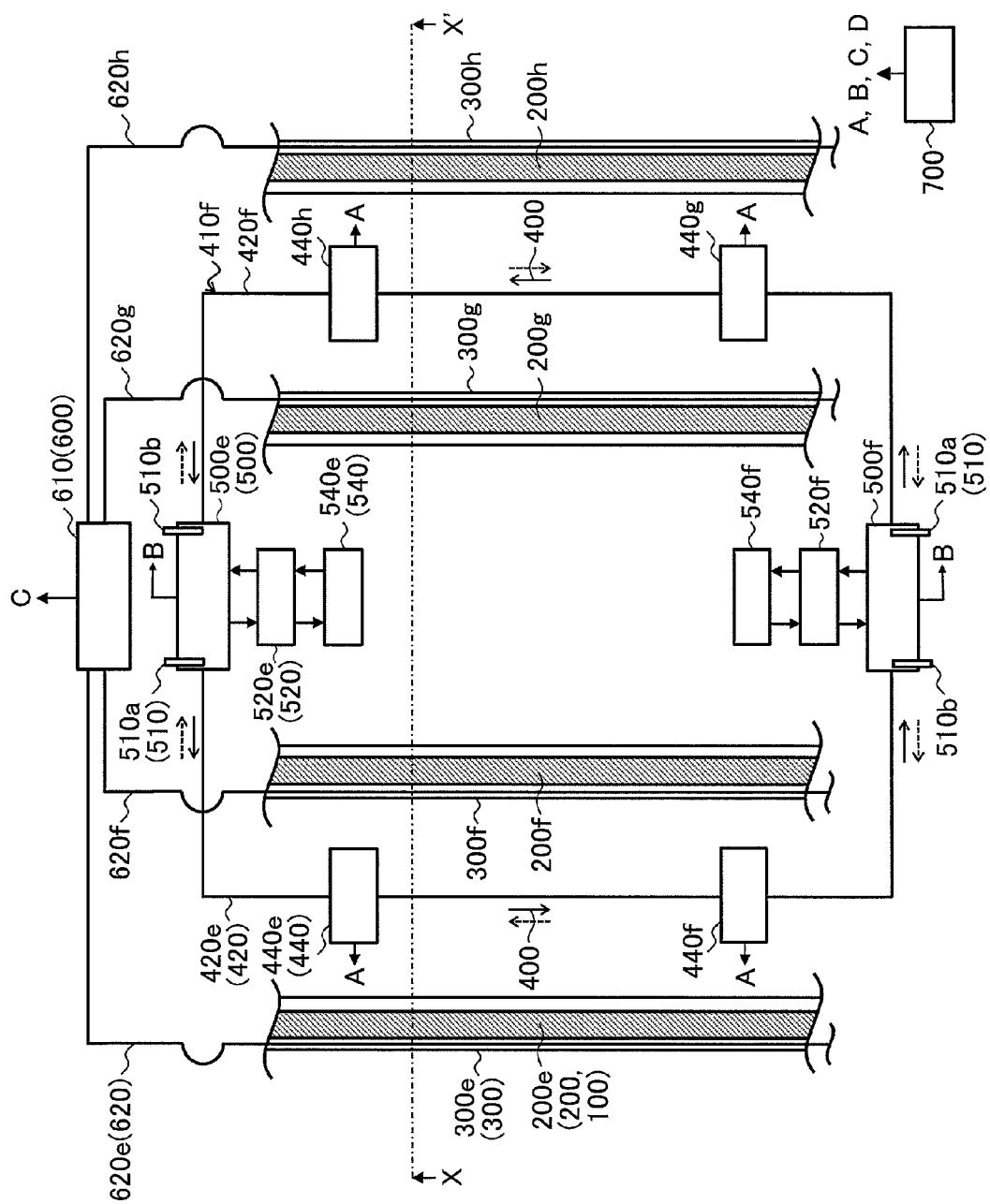
FIG. 8 is a plan view schematically illustrating a pipe type solid insulation cable system of a second embodiment.
Figure 9:
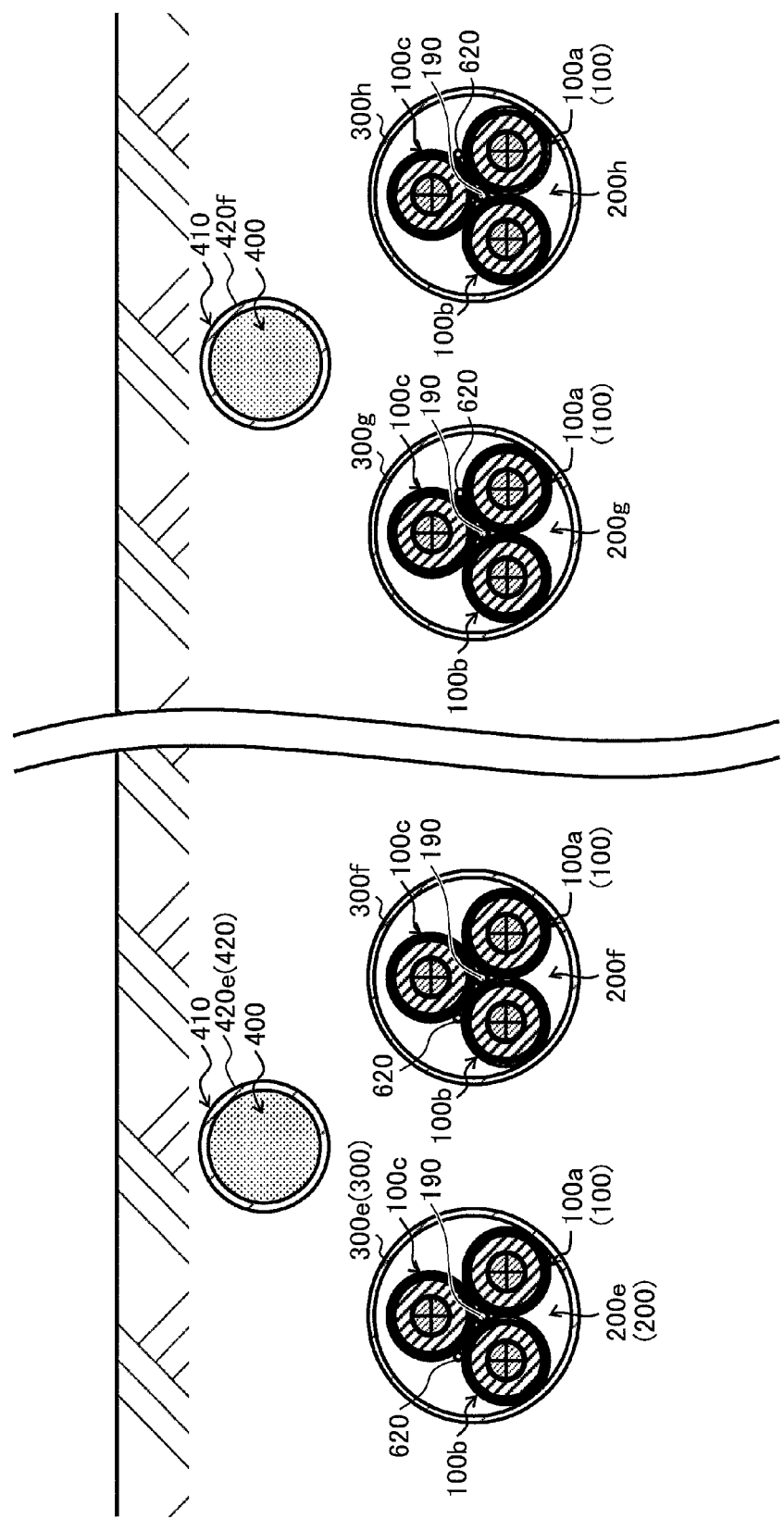
FIG. 9 is a cross-sectional view illustrating the pipe type solid insulation cable system of the second embodiment.

The pipe type XLPE cable system 12 of the embodiment is described with reference to FIG. 8 and FIG. 9. FIG. 8 is a plan view schematically illustrating the pipe type XLPE cable system 12 of the embodiment. FIG. 9 is a cross-sectional view illustrating the pipe type XLPE cable system 12 of the embodiment. FIG. 9 is a cross-sectional view of FIG. 8 taken along an X-X' line.

As illustrated in FIG. 8, the pipe type XLPE cable system 12 of the embodiment is configured to cool the XLPE cables 100 by an indirect cooling method by substituting the previously provided OF cable system 92 as described in the comparative example 2.

(Steel Pipe for XLPE Cable)

As illustrated in FIG. 8 and FIG. 9, the pipe type XLPE cable system 12 is configured to draw four lines of the XLPE cable group 200, for example. Specifically, four of the steel pipes for XLPE cable 300 (300e to 300h) are buried in the ground. The steel pipes for XLPE cable 300e to 300h are placed to be apart from each other with a predetermined distance in a horizontal direction. The steel pipes for XLPE cable 300e to 300h extend in the same direction. The XLPE cable groups 200e to 200h are inserted in the steel pipes for XLPE cable 300e to 300h, respectively.

In this embodiment, the steel pipes for OF cable 930a to 930h of the previously provided OF cable system 92, in which the insulating oil 940 is filled and in which the OF cable groups 920e to 920h are inserted, respectively, may be diverted to the steel pipes for XLPE cable 300e to 300h, respectively, by removing the insulating oil 940 and the OF cable group 920e to 920h from the steel pipes for OF cable 930e to 930h, for example.

(XLPE Cable Group (XLPE Cables))

As illustrated in FIG. 9, similar to the first embodiment, the XLPE cable group 200 of the embodiment is configured to transmit three-phase current, and includes the three XLPE cables 100 (100a to 100c), and the single return cable 190, for example.

The XLPE cable groups 200e to 200h are provided with optical fibers 620e to 620h, respectively, that constitute the cable temperature measurement device 600.

(Refrigerant Circulation Pipe)

The refrigerant pipes 420 are provided to correspond to the steel pipes for XLPE cable 300, respectively. Specifically, the refrigerant pipe 420e is provided to be adjacent to each of the steel pipes for XLPE cable 300e and 300f with a predetermined distance from each of the steel pipes for XLPE cable 300e and 300f between the steel pipes for XLPE cable 300e and 300f. The refrigerant pipe 420f is provided to be adjacent to each of the steel pipes for XLPE cable 300g and 300h with a predetermined distance from each of the steel pipes for XLPE cable 300g and 300h between the steel pipes for XLPE cable 300g and 300h. Each of the refrigerant pipes 420e and 420f extends in an axial direction of the respective steel pipes for XLPE cable 300e to 300h to extend along the respective steel pipes for XLPE cable 300e to 300h. One ends of the refrigerant pipe 420e and the refrigerant pipe 420f are connected by other refrigerant pipes 420 and the other ends of the refrigerant pipe 420e and the refrigerant pipe 420f are connected by other refrigerant pipes 420. With this configuration, the circular refrigerant circulation path 410 is formed.

In this embodiment, the components of the previously provided OF cable system 92 may be diverted. Specifically, for example, the oil circulation pipes 942e and 942f of the OF cable system 92, that are provided to be adjacent to the steel pipes for OF cable 930e and 930f, respectively, for circulating the insulating oil 940 in the steel pipes for OF cable 930e and 930f respectively, are diverted as the refrigerant pipes 420e, after removing the insulating oil 940. Similarly, the oil circulation pipes 942g and 942h of the OF cable system 92, that are provided to be adjacent to the steel pipes for OF cable 930g and 930h, respectively, are diverted as the refrigerant pipes 420f, after removing the insulating oil 940.

Further, in this embodiment, the refrigerant circulation path 410 is configured by the circularly connected refrigerant pipes 420e and 420f, diverted from the oil circulation pipes 942e to 942h, without passing through the steel pipes for XLPE cable 300e to 300h.

(Refrigerant Storage Tank)

The refrigerant storage tanks 500, the chillers 520 and the heat exchangers 540 are provided at both ends of each of the refrigerant pipes 420e and 420f, respectively. Specifically, the refrigerant storage tank 500e, the chiller 520e and the heat exchanger 540e are provided at one end of each of the refrigerant pipes 420e and 420f, and meanwhile, the refrigerant storage tank 500f, the chiller 520f and the heat exchanger 540f are provided at the other end of each of the refrigerant pipes 420e and 420f.

(Pump)

A plurality of the pumps 440 are provided along a longitudinal direction of the refrigerant circulation path 410 with a predetermined distance with each other, for example. Specifically, the pumps 440e and 440f are provided at the refrigerant pipe 420e with a predetermined distance therebetween, while the pumps 440g and 440h are provided at the refrigerant pipe 420f with a predetermined distance therebetween.

Here, the structure around the pumps 440e and 440h, and the structure around the pump 440f and 440g are the same as those described in FIG. 2, in which the pumps 440a and 440d are substituted by the pumps 440e and 440h or by the pumps 440f and 440g.

(3) Effect of the Embodiment

The pipe type XLPE cable system 12 of the embodiment is configured to indirectly cool the plurality of lines of the XLPE cable groups 200 by the single refrigerant pipe 420. Specifically, the XLPE cable groups 200e and 200f which are inserted in the steel pipes for XLPE cable 300e and 300f, respectively, are indirectly cooled by the refrigerant pipe 420e. The XLPE cable groups 200g and 200h which are inserted in the steel pipes for XLPE cable 300g and 300h, respectively, are indirectly cooled by the refrigerant pipe 420f. With this, the XLPE cable groups 200 in the steel pipes for XLPE cable 300, respectively, can be efficiently cooled by the small number of facilities.

Although a preferred embodiment of the pipe type solid insulation cable system, the method of constructing the pipe type solid insulation cable system and the method of cooling the pipe type solid insulation cable system has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

(Other Embodiments)

In the above embodiments, an example is described in which the XLPE cable group 200 including the three XLPE cables 100 is inserted in the steel pipe for XLPE cable 300. Alternatively, a single XLPE cable may be inserted in the steel pipe for XLPE cable.

In the above first embodiment, an example is described in which the pipe type XLPE cable system 10 is configured to draw two lines of the XLPE cable groups 200, includes a pair of the steel pipes for XLPE cable 300 and a pair of refrigerant pipes 420, and the refrigerant circulation path 410 is configured by circularly connecting the pair of refrigerant pipes 420. Alternatively, the pipe type XLPE cable system may be configured to draw three or more lines of the XLPE cable groups, three or more of the refrigerant pipes may be provided to be adjacent to the three or more of the XLPE cable groups, respectively, and the refrigerant circulation path may be configured by circularly connecting these refrigerant pipes.

In the above embodiments, an example is described in which the three XLPE cables 100 are helically twisted. Alternatively, the three XLPE cables are not necessarily twisted, and the three XLPE cables may be linearly provided, for example.

In the above embodiments, an example is described in which the optical fiber 620 that constitutes the cable temperature measurement device 600 is provided at outside of the three XLPE cables 100. Alternatively, the optical fiber may be provided at a center of the three XLPE cables.

In the above embodiments, an example is described in which the refrigerant circulation path 410 including the refrigerant pipes 420 and the steel pipes for XLPE cable 300 are buried in the ground. Alternatively, the refrigerant circulation path including the refrigerant pipes and the steel pipes for XLPE cable may be provided in a cavity tunnel. In such a case, the XLPE cables in the steel pipes for XLPE cable can be indirectly cooled via air in the tunnel by the refrigerant circulation path.

In the above embodiments, an example is described in which the refrigerant storage tank 500, the chiller 520 and the heat exchanger 540 are provided at each of two positions. Alternatively, when the refrigerant circulation path is short, the refrigerant storage tank, the chiller and the heat exchanger may be provided at one position.

In the above embodiments, an example is described in which the plurality of pumps 440 are provided. Alternatively, when the refrigerant circulation path is short, or when the refrigerant pipes have high compressive strength, the number of pumps may be reduced, or the single pump may be provided.

In the above embodiments, an example is described in which the pipe type XLPE cable system 10 is configured such that the direction of flow of the refrigerant 400 in the refrigerant circulation path 410 is alternately changed. Alternatively, the pipe type XLPE cable system may not be configured such that the direction of flow of the refrigerant in the refrigerant circulation path is alternately changed when a sufficient cooling effect can be obtained even when the direction of flow of the refrigerant is not changed, or when it is desirable to reduce capital investment.

In the above embodiments, an example is described in which the refrigerant circulation path 410 is configured such that, among the plurality of refrigerant pipes 420, upstream of one of the pumps 440 is connected to downstream of the other of the pumps 440, and downstream of the one of the pumps 440 is connected to upstream of the other of the pumps 440. Alternatively, the pump may be configured to be rotatable in both directions. In such a case, it is unnecessary to provide the refrigerant pipes for bypass near the pumps in the refrigerant circulation path.

In the above embodiments, an example is described in which the refrigerant pipes for bypass 420c to 420f are provided to the refrigerant pipe 420a at which the pump 440a is provided and the refrigerant pipe 420b at which the pump 440d is provided to cross with each other, the valves 460a to 460d are provided at the refrigerant pipes 420a to 420d, respectively, and the valves 460e to 460h are provided at the refrigerant pipes 420a, 420b, 420e and 420f, respectively, as the structure for alternately changing the direction of flow of the refrigerant 400.

Alternatively, the refrigerant circulation path may be configured such that the direction of flow of the refrigerant 400 is changed in each of the refrigerant pipes in which a predetermined pump is provided. Specifically, in such a case, each of the refrigerant pipes includes a first refrigerant pipe in which a first pump is provided, a first bypass refrigerant pipe that connects upstream of the first pump to downstream of the first pump of the first refrigerant pipe, and a second bypass refrigerant pipe that connects downstream of the first pump to upstream of the first pump of the first refrigerant pipe. Here, a joint portion of the first refrigerant pipe and the first bypass refrigerant pipe is positioned upstream of a joint portion of the first refrigerant pipe and the second bypass refrigerant pipe, at the upstream of the first pump, while a joint portion of the first refrigerant pipe and the first bypass refrigerant pipe is positioned upstream of a joint portion of the first refrigerant pipe and the second bypass refrigerant pipe, at the downstream of the first pump. Further, the refrigerant circulation path includes a first valve provided at the upstream of the first pump between the joint portion of the first refrigerant pipe and the first bypass refrigerant pipe and the joint portion of the first refrigerant pipe and the second bypass refrigerant pipe, and a second valve provided at the downstream of the first pump between the joint portion of the first refrigerant pipe and the first bypass refrigerant pipe and the joint portion of the first refrigerant pipe and the second bypass refrigerant pipe. The refrigerant circulation path includes a third valve provided at the first bypass refrigerant pipe, and a fourth valve provided at the second bypass refrigerant pipe. Further, the control unit controls the first valve, the second valve, the third valve and the fourth valve for alternately changing the open-close status of both of the first valve and the second valve and the open-close status of both of the third valve and the fourth valve to be opposite from each other when the direction of flow of the refrigerant is alternately changed. In this case, as it is unnecessary to provide the refrigerant pipes for bypass to pass over the steel pipes for XLPE cable, the construction can be simplified.

In the above embodiments, an example is described in which the cable temperature measurement device 600 is configured as an optical fiber temperature measurement device. Alternatively, the temperature sensor of the cable temperature measurement device may be a thermocouple. However, it is preferable that the cable temperature measurement device is configured as the optical fiber temperature measurement device because it is possible to immediately measure temperatures of a plurality of positions along the axial direction of the optical fiber.

EXAMPLES

Next, examples of the embodiment are described. These examples are just an example of the invention, and the invention is not limited to these examples.

(1) System Structure

The pipe type XLPE cable system was constructed as follows.

XLPE cable:

Normal voltage: 275 kV cross-sectional area of conductor: 1400 mm$^2$

The number of lines of XLPE cable groups: two lines

Load factor: 100% (steady state)

Earthed system: cross-bond system

Distance between centers of lines: 610 mm

Buried depth of center of steel pipe for XLPE cable: 1200 mm

Buried depth of center of refrigerant pipe: 950 mm

External diameter of the steel pipe for XLPE cable: 260 mm

External diameter of the refrigerant pipe: 130 mm

Distance between the steel pipe for XLPE cable and the refrigerant pipe (distance between an outer periphery surface of the steel pipe for XLPE cable and an outer periphery surface of the refrigerant pipe): 100 mm Soil basic temperature: 25° C.

Specific heat resistance of soil: 0.7 Km/W

Temperature of refrigerant (water) (temperature at outflow port): 5° C.

Flow rate of refrigerant: 5.0 1/s

Transmission distance: 2.5 km

Distance of refrigerant circulation path: 5.0 km

Frequency: 60 Hz (2) Evaluation

In a comparative example, cooling was not performed in the above described pipe type XLPE cable system. In example 1, cooling was performed and the direction of flow of the refrigerant was only one direction. In example 2, cooling was performed and the direction of flow of the refrigerant was alternately changed every day. Then, transmission capacity was evaluated for each of the comparative example, example 1 and example 2.

(3) Result

Table 1 illustrates results in which the transmission capacity of the pipe type XLPE cable system of each of the examples was evaluated.

TABLE 1

| | | TRANSMISSION CAPACITY |
|---|---|---|
| COMPARATIVE EXAMPLE | WITHOUT COOLING | 990 A |
| EXAMPLE 1 | COOLING (ONE DIRECTION) | 1090 A |
| EXAMPLE 2 | COOLING (TWO DIRECTIONS) | 1110 A |

As illustrated in Table 1, the transmission capacity of example 1 in which the direction of flow of the refrigerant was only one direction was increased for 10 to 12% compared with the transmission capacity of the comparative example in which cooling was not performed. It was confirmed that the XLPE cable groups in the steel pipes for XLPE cable can be indirectly cooled via the soil by flowing the refrigerant in the refrigerant circulation path in the pipe type XLPE cable system of example 1 and the transmission capacity can be increased.

Further, the transmission capacity of example 2 in which the direction of flow of the refrigerant was alternately changed was increased for about few dozen A (ampere) compared with the transmission capacity of example 1 in which the direction of flow of the refrigerant was only one direction. It was confirmed that temperature of the entirety of the refrigerant circulation path can be made uniform by alternately changing the direction of flow of the refrigerant so that the XLPE cable groups can be equally cooled. As a result, the transmission capacity can be increased as in example 2.

Although the transmission distance was 2.5 km in the above described pipe type XLPE cable system, even when the transmission distance is further longer, it was confirmed that the cooling effect similar to that of example 1 or 2 could be obtained by increasing the refrigerant flow rate to be in proportion to the distance.

As described above, it was confirmed that the XLPE cable groups in the steel pipes for XLPE cable can be easily cooled by a simple structure using indirect cooling in example 1 or 2.

According to the embodiments, a pipe type solid insulation cable system, a method of constructing the pipe type solid insulation cable system and a method of cooling the pipe type solid insulation cable system capable of easily cooling the solid insulation cable by a simple structure can be provided.

Various aspects of the subject-matter described herein are set out non-exhaustively in the following numbered clauses:

(Clause 1)
According to an embodiment, there is provided a pipe type solid insulation cable system including:
 a plurality of solid insulation cables;
 a plurality of steel pipes in which the plurality of solid insulation cables are inserted, respectively; and
 a refrigerant circulation path that includes a plurality of refrigerant pipes, which are provided to be adjacent to the plurality of steel pipes, respectively, circularly connected with each other to circulate a refrigerant therein,
 wherein the pipe type solid insulation cable system is configured to indirectly cool the plurality of solid insulation cables in the plurality of steel pipes, respectively, by cooling at least a part of a periphery of each of the plurality of steel pipes by the refrigerant circulation path without flowing the refrigerant in the plurality of steel pipes.

(Clause 2)
The pipe type solid insulation cable system of clause 1, preferably, further includes a control unit that controls to alternately change a direction of flow of the refrigerant in the refrigerant circulation path every predetermined period.

(Clause 3)
The pipe type solid insulation cable system of clause 1, preferably, further includes
 a cable temperature measurement device that measures temperature of each of the plurality of solid insulation cables; and
 a control unit that controls to alternately change a direction of flow of the refrigerant in the refrigerant circulation path when a difference between temperatures at different positions of each of the plurality of solid insulation cables in an axial direction measured by the cable temperature measurement device is greater than or equal to a predetermined value.

(Clause 4)
The pipe type solid insulation cable system of clause 2 or 3, preferably, further includes a refrigerant storage tank connected to each of the plurality of refrigerant pipes, and temporarily stores the refrigerant while cooling the refrigerant;
 wherein, when alternately changing the direction of flow of the refrigerant, the control unit controls the refrigerant storage tank such that one of the plurality of refrigerant pipes that is previously connected to an outflow port of the refrigerant storage tank is changed to be connected to an inflow port of the refrigerant storage tank, while another one of the plurality of refrigerant pipes that is previously connected to the inflow port of the refrigerant storage tank is changed to be connected to the outflow port of the refrigerant storage tank.

(Clause 5)
The pipe type solid insulation cable system of any one of clauses 2 to 4, preferably, further includes a pump that is connected to one of the plurality of refrigerant pipes and transmits the refrigerant to the refrigerant circulation path in a predetermined direction,
 wherein, when alternately changing the direction of flow of the refrigerant, the control unit controls the refrigerant circulation path such that the direction of flow of the refrigerant is changed at least at a part of the refrigerant circulation path while maintaining a direction of the refrigerant transmitted by the pump by connecting, among the plurality of refrigerant pipes, upstream of the pump to downstream of the pump and downstream of the pump to upstream of the pump.

(Clause 6)
The pipe type solid insulation cable system of clause 5, preferably, further includes a plurality of the pumps including a first pump and a second pump,
 wherein the plurality of refrigerant pipes includes
 a first refrigerant pipe at which the first pump is provided, the first refrigerant pipe being adjacent to a first steel pipe among the plurality of steel pipes,
 a second refrigerant pipe at which the second pump is provided to transmit the refrigerant in a direction that is opposite to that by the first pump, the second refrigerant pipe being adjacent to a second steel pipe among the plurality of steel pipes,
 a third refrigerant pipe that connects the first refrigerant pipe at upstream of the first pump, and the second refrigerant pipe at downstream of the second pump, and
 a fourth refrigerant pipe that connects the first refrigerant pipe at an opposite side of the first pump while interposing a joint portion of the first refrigerant pipe and the third refrigerant pipe, and the second refrigerant pipe between a joint portion of the second refrigerant pipe and the third refrigerant pipe and the second pump,
wherein the refrigerant circulation path includes
a first valve provided at the first refrigerant pipe between the joint portion of the first refrigerant pipe and the third refrigerant pipe and a joint portion of the first refrigerant pipe and the fourth refrigerant pipe,
a second valve provided at the second refrigerant pipe between the joint portion of the second refrigerant pipe and the third refrigerant pipe and a joint portion of the second refrigerant pipe and the fourth refrigerant pipe,
a third valve provided at the third refrigerant pipe, and
a fourth valve provided at the fourth refrigerant pipe,
wherein open-close statuses of the first valve and the second valve are the same,
wherein open-close statuses of the third valve and the fourth valve are same and opposite to the open-close statuses of the first valve and the second valve,
wherein, when alternately changing the direction of flow of the refrigerant, the control unit controls the first valve, the second valve, the third valve, and the fourth valve such that the open-close statuses of the first valve and the second valve and the open-close statuses of the third valve and the fourth valve are alternately changed to opposite statuses.

(Clause 7)

The pipe type solid insulation cable system of any one of clauses 2 to 4, preferably, further includes a pump configured to be capable of circulating the refrigerant in the refrigerant circulation path in two directions,
wherein, when alternately changing the direction of flow of the refrigerant, the control unit controls the pump to be rotated in an opposite direction.

(Clause 8)

The pipe type solid insulation cable system of clause 1, preferably, further includes
a cable temperature measurement device that measures temperature of each of the plurality of solid insulation cables;
a pump that circulates the refrigerant in the refrigerant circulation path; and
a control unit that controls the pump to adjust a flow rate of the refrigerant based on temperature of each of the plurality of solid insulation cables measured by the cable temperature measurement device.

(Clause 9)

The pipe type solid insulation cable system of clause 8, preferably, wherein the control unit controls the pump such that flow rate of the refrigerant is adjusted based on temperature at a portion that is the highest among the plurality of solid insulation cables.

(Clause 10)

The pipe type solid insulation cable system of any one of clauses 5, 8 and 9, preferably,
wherein the cable temperature measurement device includes
a plurality of optical fibers that are provided along the plurality of solid insulation cables in the plurality of steel pipes, respectively, and
a temperature profile measurement unit that causes predetermined light to be injected into each of the optical fibers and measures temperature at a predetermined measurement position in an axial direction of the respective optical fiber by detecting Raman backscattering generated at the measurement position.

(Clause 11)

The pipe type solid insulation cable system of clause 1, preferably, further includes
a refrigerant storage tank connected to each of the plurality of refrigerant pipes, and temporarily stores the refrigerant while cooling the refrigerant;
a refrigerant temperature measurement unit that measures temperature of the refrigerant in the refrigerant storage tank;
a pump that circulates the refrigerant into the refrigerant circulation path via the refrigerant storage tank; and
a control unit that controls the pump to adjust a flow rate of the refrigerant based on the temperature in the refrigerant storage tank measured by the refrigerant temperature measurement unit.

(Clause 12)

The pipe type solid insulation cable system of clause 11, preferably, wherein the control unit controls the pump to increase the flow rate of the refrigerant when a difference between temperature of the refrigerant flowing out from the refrigerant storage tank and temperature of the refrigerant flowing into the refrigerant storage tank is greater than or equal to a predetermined value.

(Clause 13)

The pipe type solid insulation cable system of clause 8 or 11, preferably, further includes a plurality of the pumps that are provided along a longitudinal direction of the refrigerant circulation path with a predetermined distance.

(Clause 14)

The pipe type solid insulation cable system of any one of clauses 1 to 13, preferably,
wherein the pipe type solid insulation cable system is configured by diverting a previously provided oil filled cable system, including
a plurality of steel pipes for oil filled cable; in each of which insulating oil is filled and in which a plurality of oil filled cables are inserted, respectively, and
a plurality of oil circulation pipes, which are provided to be adjacent to the plurality of steel pipes for oil filled cable, respectively, independently circulating the insulating oil in the plurality of steel pipes for oil filled cable, respectively,
wherein the plurality of steel pipes of the pipe type solid insulation cable system are configured by diverting the plurality of steel pipes for oil filled cable by removing the insulating oil and the plurality of oil filled cables from the plurality of steel pipes for oil filled cable, respectively,
wherein the plurality of refrigerant pipes are configured by diverting the plurality of oil circulation pipes by removing the insulating oil from the plurality of oil circulation pipes, and
wherein the refrigerant circulation path is configured by circularly connecting the plurality of refrigerant pipes, diverted from the plurality of oil circulation pipes, without passing through the plurality of steel pipes.

(Clause 15)

The pipe type solid insulation cable system of any one of clauses 1 to 14, preferably,
wherein the plurality of solid insulation cables include a first solid insulation cable and a second solid insulation cable,
wherein the plurality of steel pipes include a first steel pipe in which the first solid insulation cable is inserted, and a second steel pipe in which the second solid insulation cable is inserted, and
wherein the refrigerant circulation path includes first refrigerant pipe provided to be adjacent to the first steel pipe, and a second refrigerant pipe provided to be adjacent to the second steel pipe to circulate the refrigerant under a status that the first refrigerant pipe and the second refrigerant pipe are circularly connected.

(Clause 16)

The pipe type solid insulation cable system of any one of clauses 1 to 14, preferably, wherein the plurality of solid insulation cables include a first solid insulation cable, a second solid insulation cable, a third solid insulation cable and a fourth solid insulation cable, wherein the plurality of steel pipes includes a first steel pipe in which the first solid insulation cable is inserted, a second steel pipe in which the second solid insulation cable is inserted, a third steel pipe in which the third solid insulation cable is inserted, and a fourth steel pipe in which the fourth solid insulation cable is inserted, and wherein the refrigerant circulation path includes a first refrigerant pipe provided to be adjacent to each of the first steel pipe and the second steel pipe, and a second refrigerant pipe provided to be adjacent to each of the third steel pipe and the fourth steel pipe to circulate the refrigerant under a status that the first refrigerant pipe and the second refrigerant pipe are circularly connected.

(Clause 17)

The pipe type solid insulation cable system of clause 15 or 16, preferably, wherein the second refrigerant pipe is configured to flow the refrigerant in a direction that is different from that by the first refrigerant pipe.

(Clause 18)

According to another embodiment, there is provided a method of constructing a pipe type solid insulation cable system by diverting a previously provided oil filled cable system, the previously provided oil filled cable system including
a plurality of steel pipes for oil filled cable, in each of which insulating oil is filled and in which a plurality of oil filled cables are inserted, respectively, and
a plurality of oil circulation pipes, which are provided to be adjacent to the plurality of steel pipes for oil filled cable, respectively, and independently circulating the insulating oil in the plurality of steel pipes for oil filled cable, respectively, the method including:
removing the insulating oil and the plurality of oil filled cables from the plurality of steel pipes for oil filled cable, respectively, and removing the insulating oil from the plurality of oil circulation pipes;
inserting a plurality of solid insulation cables in a plurality of steel pipes, respectively, which are diverted from the plurality of steel pipes for oil filled cable, respectively; and
circularly connecting a plurality of refrigerant pipes, diverted from the plurality of oil circulation pipes, respectively, to constitute a refrigerant circulation path in which refrigerant is circulated, wherein the refrigerant circulation path is configured to indirectly cool the plurality of solid insulation cables in the plurality of steel pipes, respectively, by cooling at least a part of periphery of each of the plurality of steel pipes without flowing the refrigerant in the plurality of steel pipes.

(Clause 19)

The pipe type solid insulation cable system of clause 18, preferably, wherein in the removing, while removing the insulating oil and the plurality of oil filled cables from the plurality of steel pipes for oil filled cable of a predetermined length, respectively, and removing the insulating oil from the plurality of oil circulation pipes of a predetermined length, maintaining circulation of the insulating oil in the plurality of steel pipes for oil filled cable of the remaining length and the plurality of oil circulation pipes of the remaining length, wherein in the inserting, diverting the plurality of steel pipes for oil filled cable of the predetermined length from which the insulating oil and the plurality of oil filled cables are removed, respectively, as the plurality of steel pipes, inserting the plurality of solid insulation cables in the plurality of steel pipes, respectively, and connecting the plurality of solid insulation cables to the plurality of oil filled cables of the remaining length, respectively, wherein in the circularly connecting, diverting the plurality of oil circulation pipes of the predetermined length from which the insulating oil is removed as the plurality of refrigerant pipes, and circularly connecting the plurality of refrigerant pipes to constitute the refrigerant circulation path, and wherein the removing, the inserting and the circularly connecting are repeatedly performed to substitute the oil filled cable system of the entire length to the pipe type solid insulation cable system.

(Clause 20)

According to another embodiment, there is provided a method of cooling a pipe type solid insulation cable system, including
a plurality of solid insulation cables, and
a plurality of steel pipes in which the plurality of solid insulation cables are inserted, respectively,
the method including:
constructing a refrigerant circulation path by providing a plurality of refrigerant pipes to be adjacent to the plurality of steel pipes, respectively, and circularly connecting the plurality of refrigerant pipes; and
circulating a refrigerant in the refrigerant circulation path,
wherein in the circulating, the plurality of solid insulation cables in the plurality of steel pipes, respectively, are indirectly cooled by cooling at least a part of periphery of each of the plurality of steel pipes by the refrigerant circulation path without flowing the refrigerant in each of the plurality of steel pipes.

What is claimed is:
1. A pipe type solid insulation cable system comprising:
a plurality of solid insulation cables, the plurality of solid insulation cables including at least a first solid insulation cable and a second solid insulation cable;
a plurality of steel pipes in which the plurality of solid insulation cables are inserted, respectively, the plurality of steel pipes including at least a first steel pipe and a second steel pipe in which the first solid insulation cable and the second solid insulation cable are respectively inserted; and
a refrigerant circulation path that includes a plurality of refrigerant pipes, which are provided to be adjacent to the plurality of steel pipes, respectively, the plurality of refrigerant pipes including at least a first refrigerant pipe and a second refrigerant pipe respectively provided to be adjacent to the first steel pipe and the second steel pipe, the plurality of refrigerant pipes including the first refrigerant pipe and the second refrigerant pipe being circularly connected with each other to circulate a refrigerant therein,
wherein the pipe type solid insulation cable system is configured to indirectly cool the plurality of solid insulation cables in the plurality of steel pipes, respectively, by cooling at least a part of a periphery of each of the plurality of steel pipes by the refrigerant circulation path without flowing the refrigerant in the plurality of steel pipes.

2. The pipe type solid insulation cable system according to claim 1, further comprising a control unit that controls to alternately change a direction of flow of the refrigerant in the refrigerant circulation path every predetermined period.

3. The pipe type solid insulation cable system according to claim 1, further comprising:
a cable temperature measurement device that measures temperature of each of the plurality of solid insulation cables; and
a control unit that controls to alternately change a direction of flow of the refrigerant in the refrigerant circulation path when a difference between temperatures at different positions of each of the plurality of solid insulation cables in an axial direction measured by the cable temperature measurement device is greater than or equal to a predetermined value.

4. The pipe type solid insulation cable system according to claim 3,
wherein the cable temperature measurement device includes
a plurality of optical fibers that are provided along the plurality of solid insulation cables in the plurality of steel pipes, respectively, and
a temperature profile measurement unit that causes predetermined light to be injected into each of the optical fibers and measures temperature at a predetermined measurement position in an axial direction of the respective optical fiber by detecting Raman backscattering generated at the measurement position.

5. The pipe type solid insulation cable system according to claim 1, further comprising:
a cable temperature measurement device that measures temperature of each of the plurality of solid insulation cables;
a pump that circulates the refrigerant in the refrigerant circulation path; and
a control unit that controls the pump to adjust a flow rate of the refrigerant based on temperature of each of the plurality of solid insulation cables measured by the cable temperature measurement device.

6. The pipe type solid insulation cable system according to claim 5,
wherein the cable temperature measurement device includes
a plurality of optical fibers that are provided along the plurality of solid insulation cables in the plurality of steel pipes, respectively, and
a temperature profile measurement unit that causes predetermined light to be injected into each of the optical fibers and measures temperature at a predetermined measurement position in an axial direction of the respective optical fiber by detecting Raman backscattering generated at the measurement position.

7. The pipe type solid insulation cable system according to claim 5, further comprising a plurality of the pumps that are provided along a longitudinal direction of the refrigerant circulation path with a predetermined distance.

8. The pipe type solid insulation cable system according to claim 1, further comprising:
a refrigerant storage tank connected to each of the plurality of refrigerant pipes, and temporarily stores the refrigerant while cooling the refrigerant;
a refrigerant temperature measurement unit that measures temperature of the refrigerant in the refrigerant storage tank;
a pump that circulates the refrigerant into the refrigerant circulation path via the refrigerant storage tank; and
a control unit that controls the pump to adjust a flow rate of the refrigerant based on the temperature in the refrigerant storage tank measured by the refrigerant temperature measurement unit.

9. The pipe type solid insulation cable system according to claim 8, wherein the control unit controls the pump to increase the flow rate of the refrigerant when a difference between temperature of the refrigerant flowing out from the refrigerant storage tank and temperature of the refrigerant flowing into the refrigerant storage tank is greater than or equal to a predetermined value.

10. The pipe type solid insulation cable system according to claim 8, further comprising a plurality of the pumps that are provided along a longitudinal direction of the refrigerant circulation path with a predetermined distance.

11. The pipe type solid insulation cable system according to claim 1,
wherein the pipe type solid insulation cable system is configured by diverting a previously provided oil filled cable system, including
a plurality of steel pipes for oil filled cable, in each of which insulating oil is filled and in which a plurality of oil filled cables are inserted, respectively, and
a plurality of oil circulation pipes, which are provided to be adjacent to the plurality of steel pipes for oil filled cable, respectively, independently circulating the insulating oil in the plurality of s steel pipes for oil filled cable, respectively,
wherein the plurality of steel pipes of the pipe type solid insulation cable system are configured by diverting the plurality of steel pipes for oil filled cable by removing the insulating oil and the plurality of oil filled cables from the plurality of steel pipes for oil filled cable, respectively,
wherein the plurality of refrigerant pipes are configured by diverting the plurality of oil circulation pipes by removing the insulating oil from the plurality of oil circulation pipes, and
wherein the refrigerant circulation path is configured by circularly connecting the plurality of refrigerant pipes, diverted from the plurality of oil circulation pipes, without passing through the plurality of steel pipes.

12. A method of cooling a pipe type solid insulation cable system, the pipe type solid insulation cable system including
a plurality of solid insulation cables, the plurality of solid insulation cables including at least a first solid insulation cable and a second solid insulation cable,
a plurality of steel pipes in which the plurality of solid insulation cables are inserted, respectively, the plurality of steel pipes including at least a first steel pipe and a second steel pipe in which the first solid insulation cable and the second solid insulation cable are respectively inserted,
a refrigerant circulation path that includes a plurality of refrigerant pipes, which are provided to be adjacent to the plurality of steel pipes, respectively, the plurality of refrigerant pipes including at least a first refrigerant pipe and a second refrigerant pipe respectively provided to be adjacent to the first steel pipe and the second steel pipe, the plurality of refrigerant pipes including the first refrigerant pipe and the second refrigerant pipe being circularly connected with each other to circulate a refrigerant therein, the method comprising:

circulating a refrigerant in the refrigerant circulation path to indirectly cool the plurality of solid insulation cables in the plurality of steel pipes, respectively, by cooling at least a part of a periphery of each of the plurality of steel pipes by the refrigerant circulation path without flowing the refrigerant in each of the plurality of steel pipes.

* * * * *